March 8, 1966   A. T. SIEDENTOP   3,238,936
APPARATUS FOR MECHANICAL CORRECTIVE THERAPY
Filed April 16, 1962   10 Sheets-Sheet 1
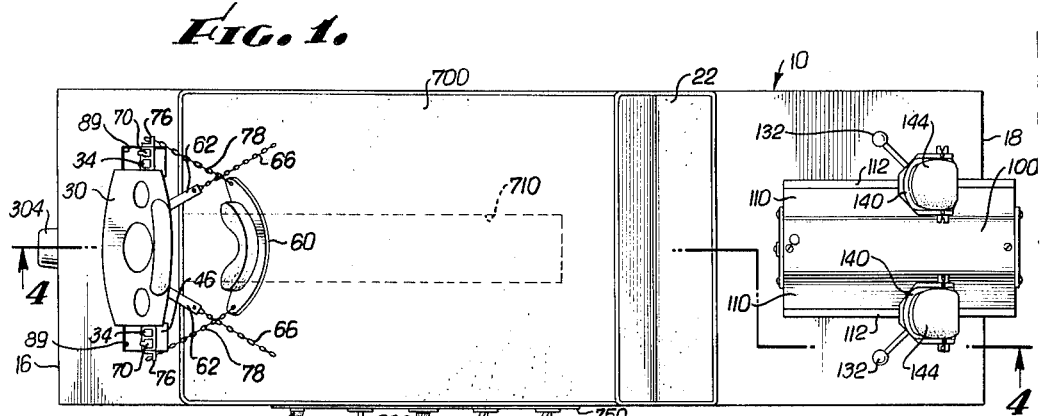
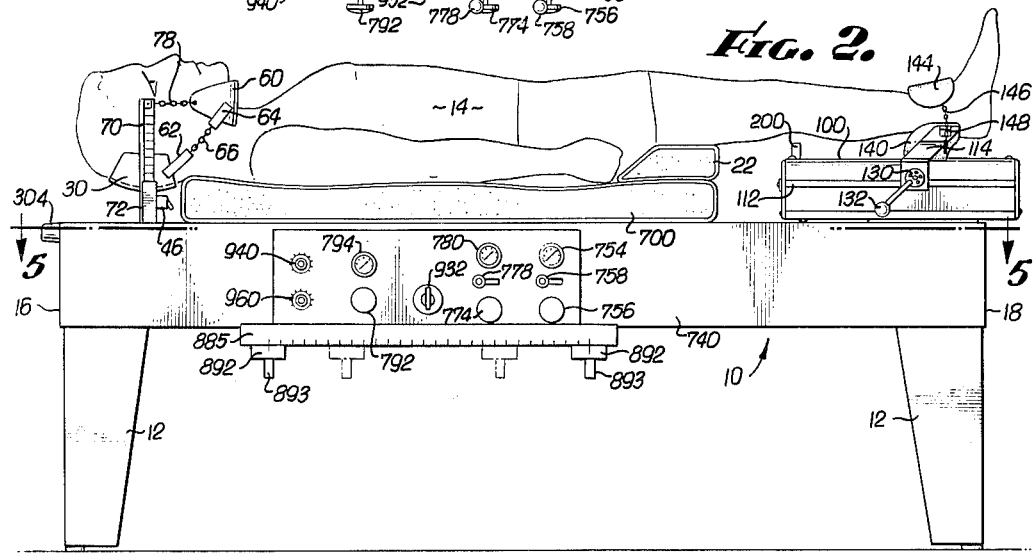
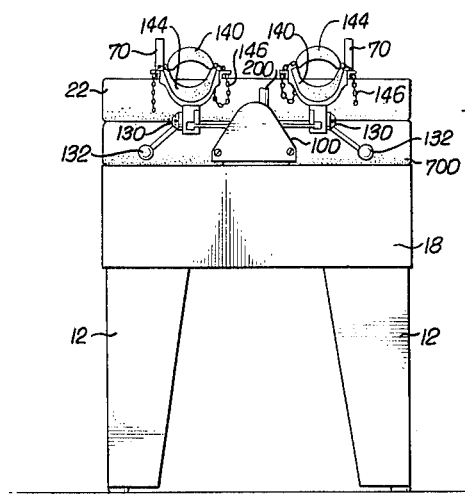
INVENTOR.
ALFRED T. SIEDENTOP
BY
Huebner & Worrel
ATTORNEYS.

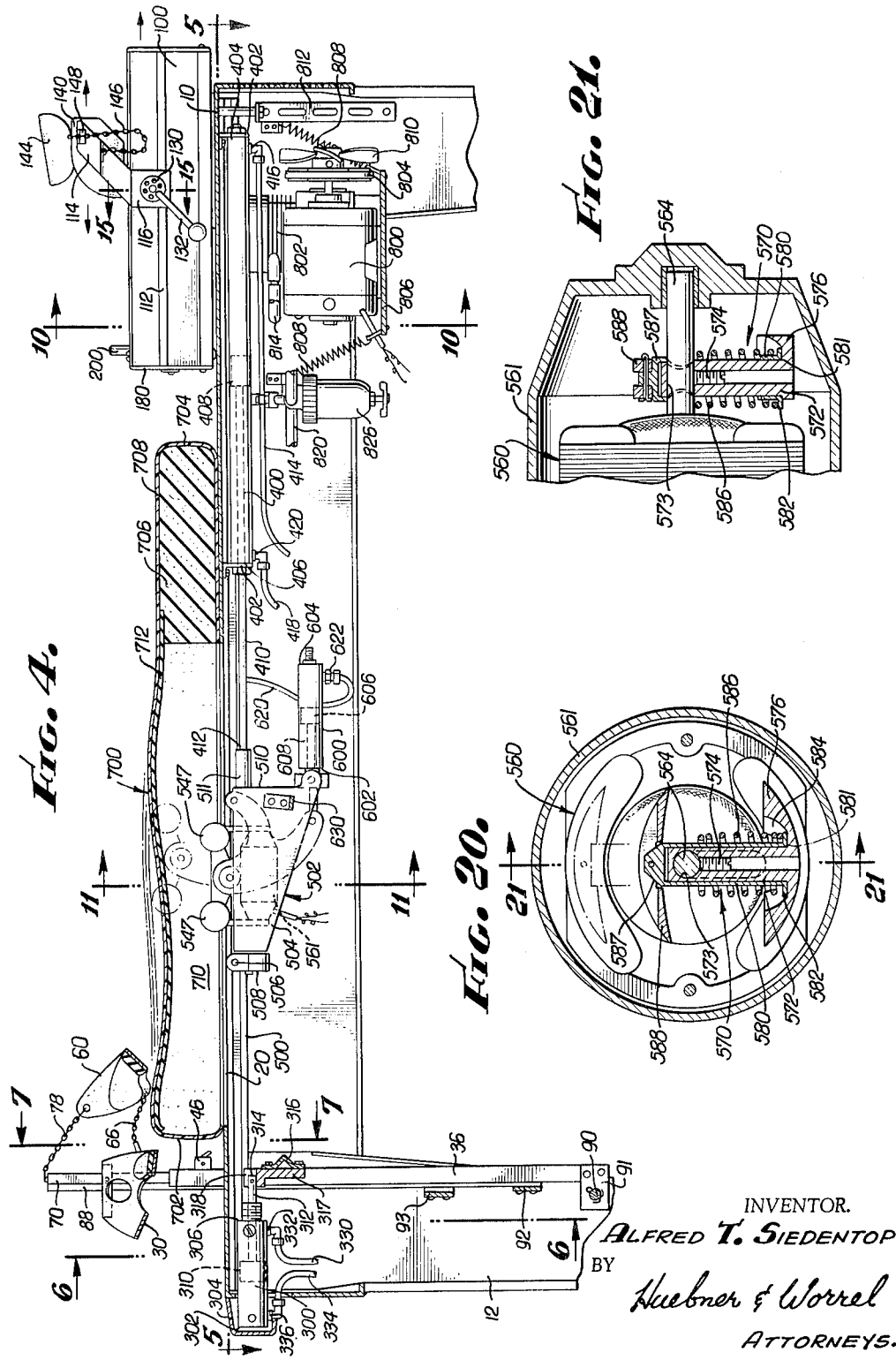

March 8, 1966  A. T. SIEDENTOP  3,238,936
APPARATUS FOR MECHANICAL CORRECTIVE THERAPY
Filed April 16, 1962  10 Sheets-Sheet 3
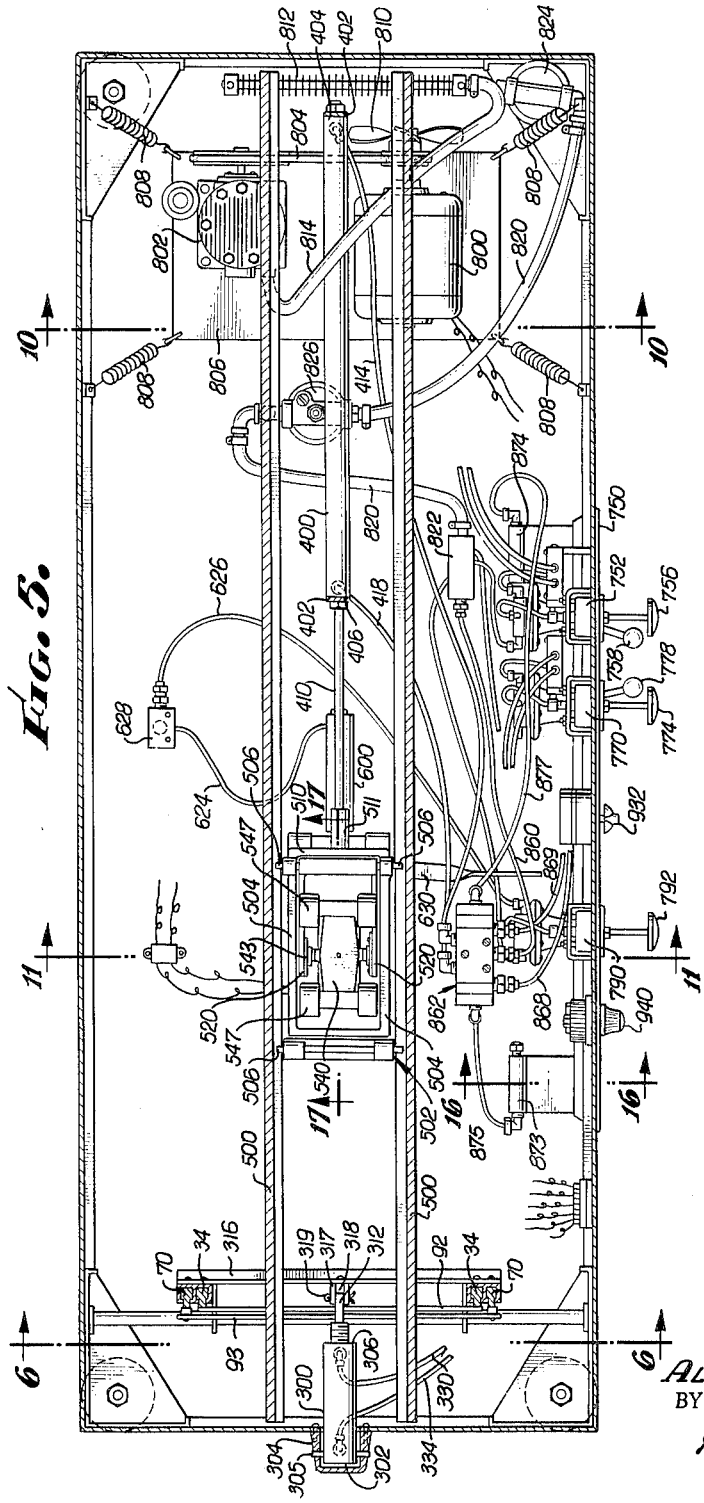
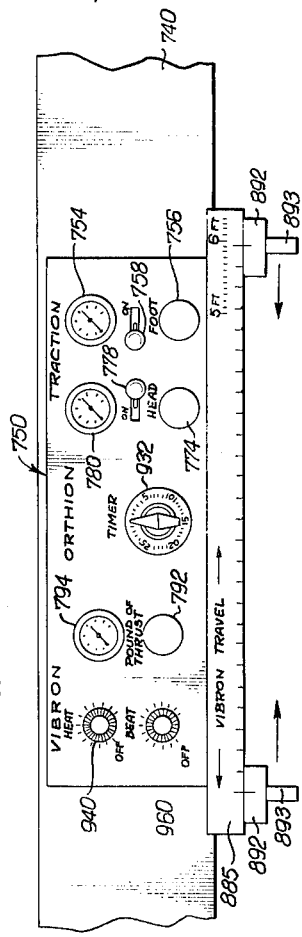
INVENTOR.
ALFRED T. SIEDENTOP
BY
Huebner & Worrel
ATTORNEYS.

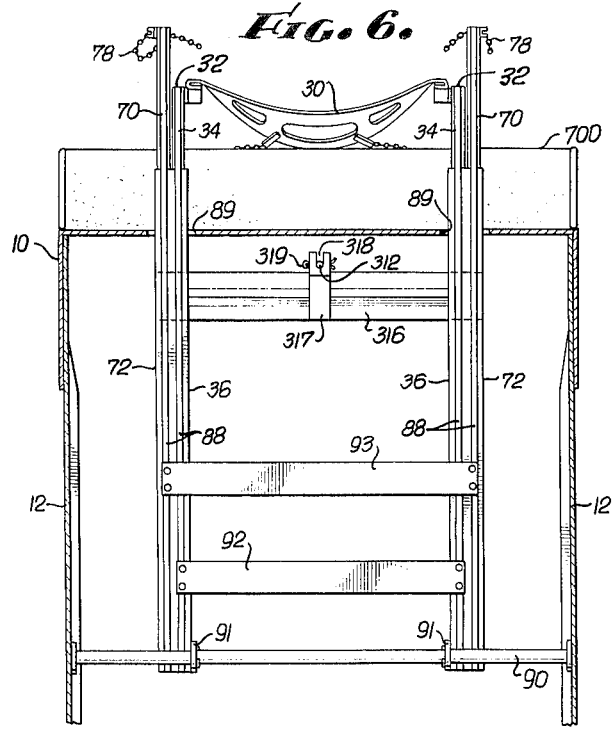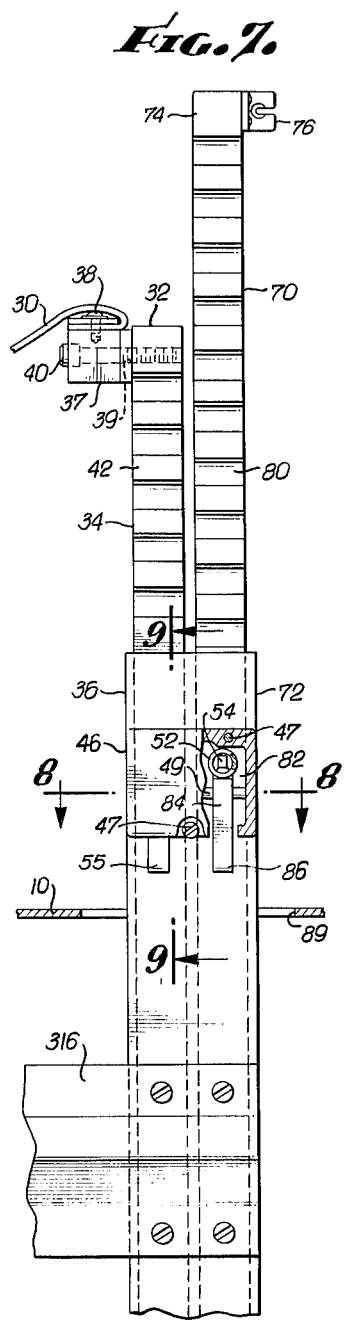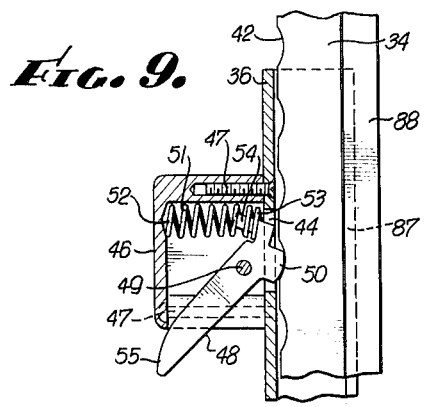

March 8, 1966  A. T. SIEDENTOP  3,238,936
APPARATUS FOR MECHANICAL CORRECTIVE THERAPY
Filed April 16, 1962  10 Sheets-Sheet 5
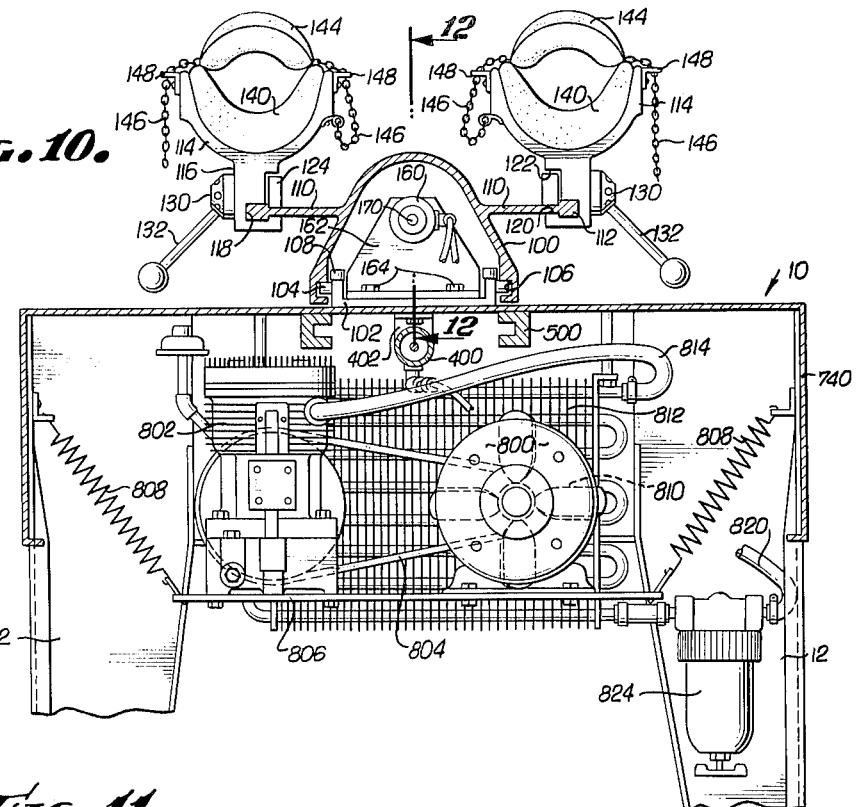
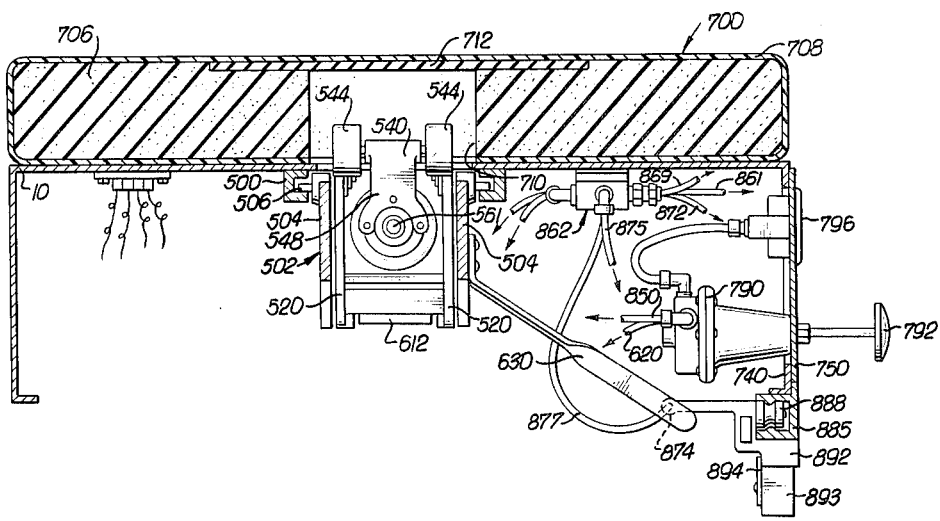
INVENTOR.
ALFRED T. SIEDENTOP
BY
Huebner & Worrel
ATTORNEYS.

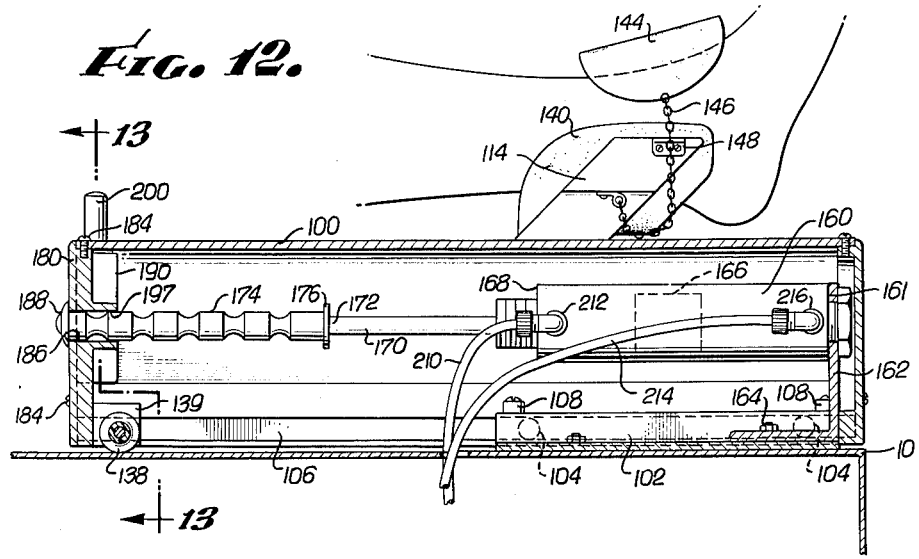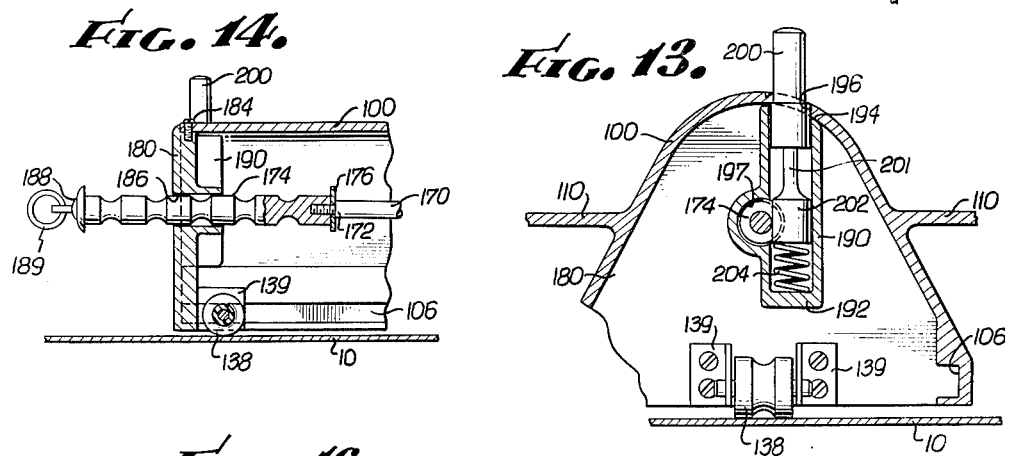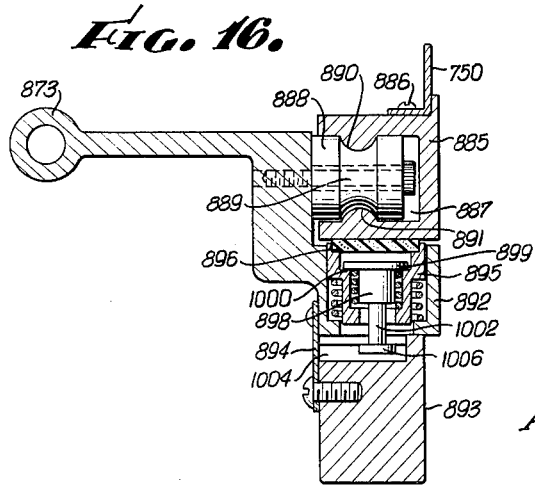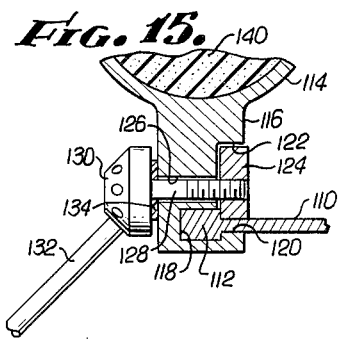

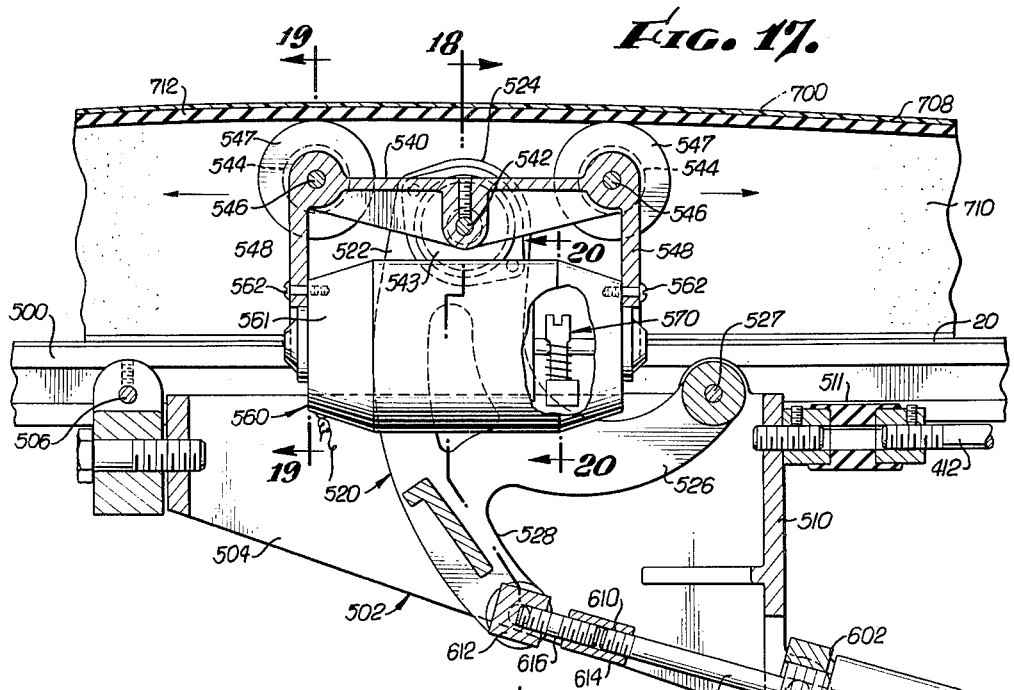
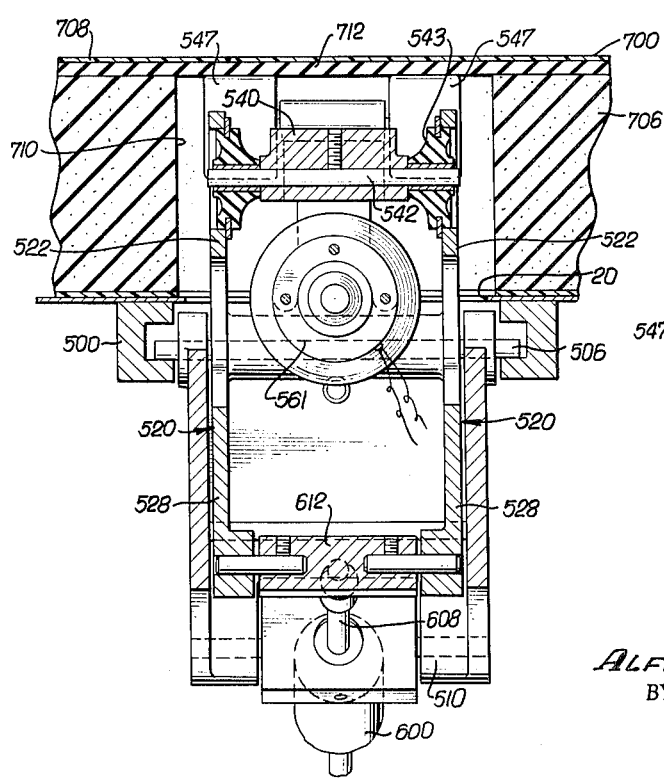
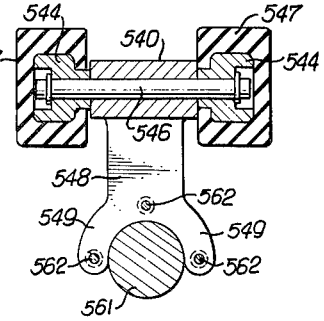

March 8, 1966     A. T. SIEDENTOP     3,238,936
APPARATUS FOR MECHANICAL CORRECTIVE THERAPY
Filed April 16, 1962     10 Sheets-Sheet 8
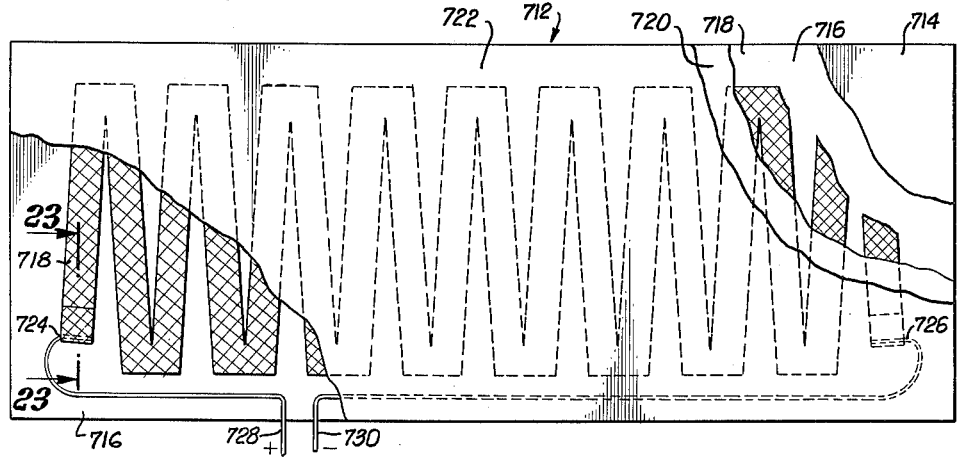
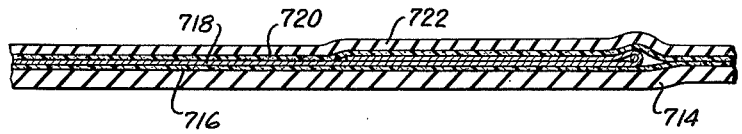
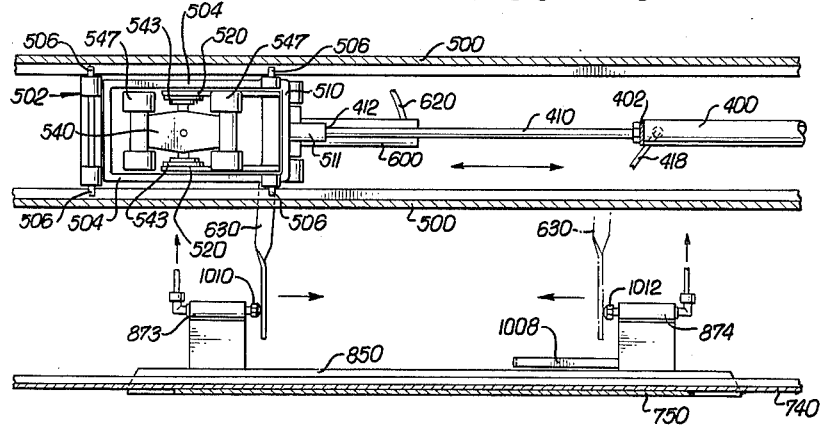
INVENTOR.
ALFRED T. SIEDENTOP
BY
Huebner & Worrel
ATTORNEYS.

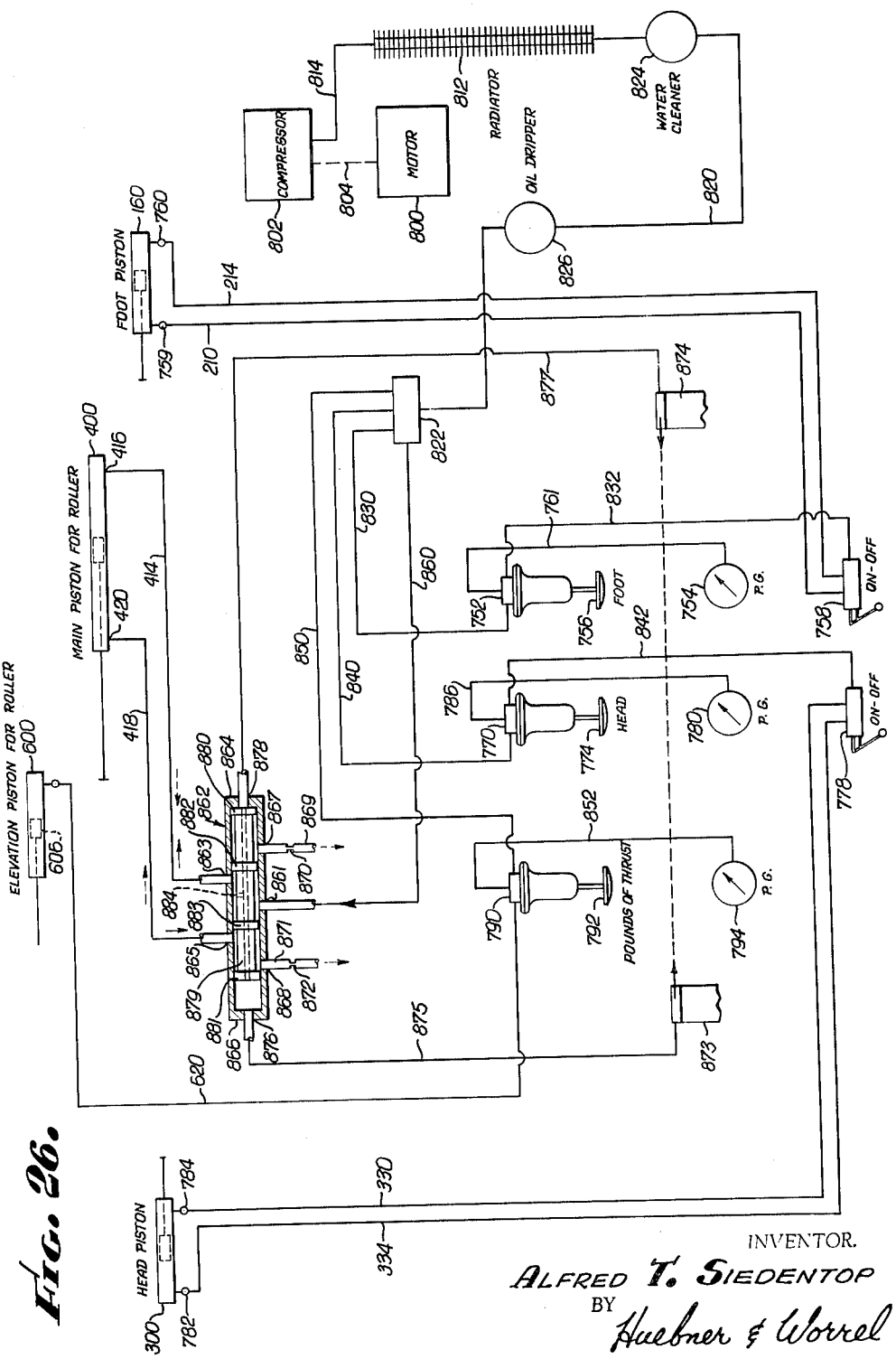

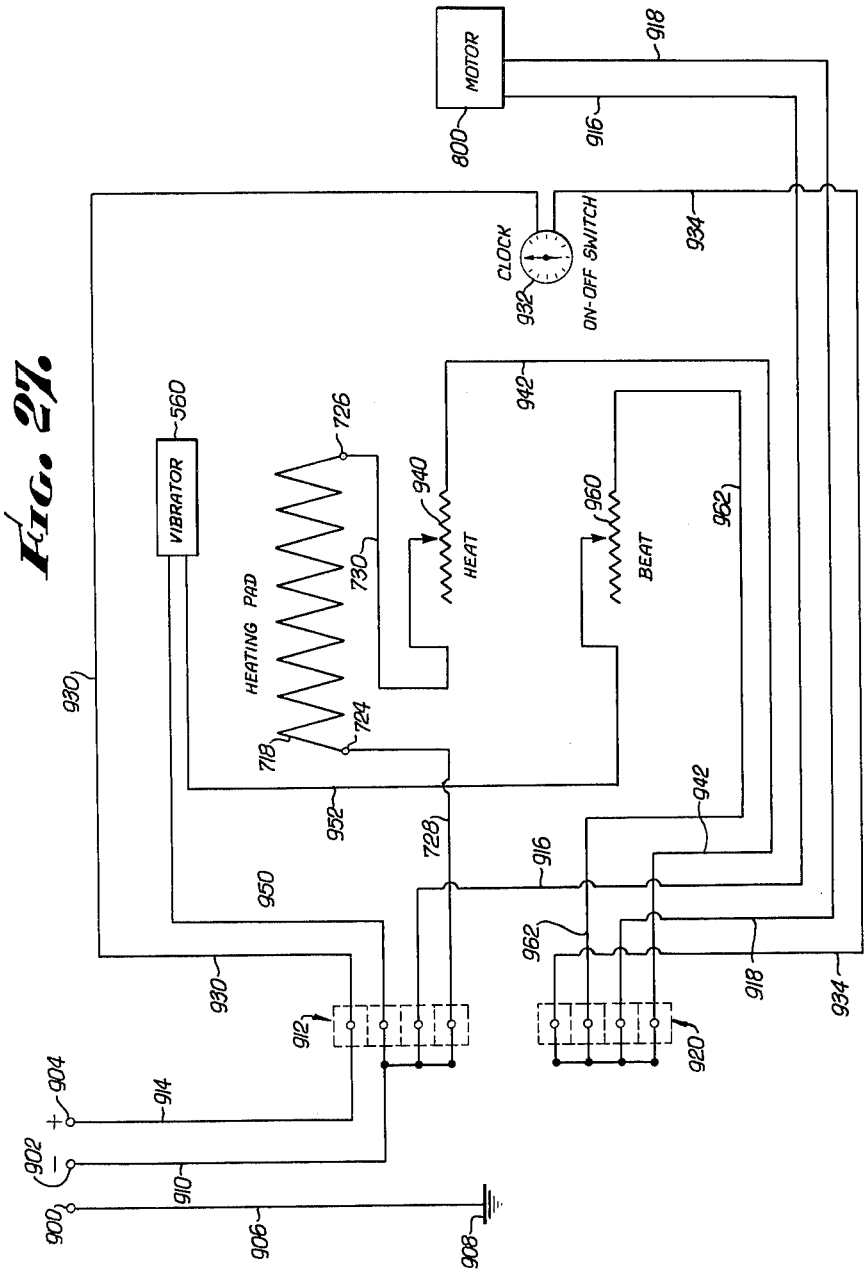

United States Patent Office 3,238,936
Patented Mar. 8, 1966

3,238,936
APPARATUS FOR MECHANICAL CORRECTIVE THERAPY
Alfred T. Siedentop, Los Angeles, Calif., assignor to National Foundation for Physical Medicine and Geriatrics, Newport Beach, Calif., a non-profit corporation of California
Filed Apr. 16, 1962, Ser. No. 187,597
32 Claims. (Cl. 128—24.3)

This invention relates to a method of corrective therapeutic treatment, particularly of the spine, and apparatus for applying such therapy. It is especially adaptable for treatment of every type of body and limb malfunction which can be traceable to spinal muscle spasm, intervertebral disc conditions, subluxated vertebrae, acute and chronic whiplash conditions, and general pain syndrome management relating to the spinal column, but from the further description of the method and apparatus of the present invention hereinafter contained, it will be apparent that the method and apparatus are also advantageously used whenever the application of traction, vibration or massage, and heat, and particularly the simultaneous application of two dimensional traction, plus three dimensional vibratory traction and heat is recommended. In other words, the invention relates directly to the treatment of spinal and related disorders by means of a method and apparatus which apply three dimensional traction, heat, and paravertebral soft tissue stimulation simultaneously, but which may also be utilized to apply such treatments separately and individually, or in any desired combination of treatments.

The method and apparatus of the present invention serve to correct joint movement in the spinal column, and to retain such correction by means of the strengthening of the collagen tissues and muscle fibres which support the corrected area.

As compared with other presently available traction devices, the device of the present invention permits minute control of the amount of traction to be applied to a patient. Thus, while therapy is being applied, the patient's spine may be held in relatively mild and comfortable traction, and simultaneously an accurately controlled amount of thrust may be applied by an element of the device which travels at controlled speed up and down the spinal column, so that the muscles, tendons and cartilage of the entire vertebral system, or selected specific areas thereof, may receive the administration of a deep movement while the entire spinal column is under traction. The result is that muscular spasticity is reduced, circulation is increased, and tissue tone is normalized. Also, simultaneously, controlled vibration or massage and heat may be applied to enhance capillary permeability and thereby increase local metabolism.

The advantages of the method and apparatus of the present invention over other therapeutic devices presently available are that several therapeutic modalities are employed simultaneously under accurately controllable conditions, and that the forces of traction applied cube the traction placed on the spine and control the stress of one dimension of traction by applying it at a given time to a single joint, while the remaining two dimensions of traction are being applied to activate constantly the entire spinal column. For example, the cervical traction, which may average ten to fifteen pounds, indues a responding force, produced by the muscles and ligaments, to the same magnitude, and the pelvic traction, which may average twenty-five to thirty-five pounds, also induces a responding force to the same magnitude, thus compounding the applied force, all of which is multiplied by the upward force, which may average thirty-five pounds, which upward force acts on the entire spinal column through its application to individual vertebrae. Meanwhile, the recognized therapeutic benefits of vibration and heat are simultaneously applied.

It will be recognized that the total force resulting from the multiplication of forces hereinabove described, if placed unidirectionally, would be beyond human endurance, but because the forces are applied in three dimensions, the effect on a patient being treated by the method and apparatus of the present invention is completely mild and comfortable, and it is an object of the invention to provide such a method and apparatus which will so apply said forces.

It is a further object of the invention to provide a method and apparatus by which the application of such collective forces will induce motion, and in which the collective forces are dispersed in three directions, so as to immobilize resistive forces otherwise present.

It is a still further object of the invention to provide a method and apparatus, the application of which will support a patient's natural body force, and will cause the correction of malfunction to retain its physiological position.

It is another object of the invention to provide a method and apparatus of the character described in which calculated two dimensional traction within muscular tolerance may be applied to mobilize responsive muscle tension without rigidity, while at the same time third dimensional traction is applied to stretch and tone the musculature and the ligaments of the spinal column.

It is yet another object of the invention to provide such a method and apparatus in which the combination of forces and treatment applied to a patient will normalize motion of the spinal joints, thereby expanding the intervertebral discs and promoting relaxation, while at the same time collagen tissues surrounding the vertebral column are passively strengthened, thus correcting the core of postural variances and associated diseases and conditions.

It is a further object of the invention to provide a method of therapeutic treatment and an apparatus for applying such method in which precise and progressive control may be provided so that a graduated series of treatments may be tailored to the individual needs of patients.

In the drawings:
FIGURE 1 is a plan view of the apparatus of the present invention.
FIGURE 2 is a side elevational view of said apparatus.
FIGURE 3 is an end view of said apparatus from the foot end thereof.
FIGURE 4 is an enlarged view taken on the line 4—4 of FIGURE 1.
FIGURE 5 is a view taken on the line 5—5 of FIGURE 4.
FIGURE 6 is a view taken on the line 6—6 of FIGURE 4.
FIGURE 7 is an enlarged view taken on the line 7—7 of FIGURE 4.
FIGURE 8 is a further enlarged view taken on the line 8—8 of FIGURE 7.
FIGURE 9 is a view taken on the line 9—9 of FIGURE 7.
FIGURE 10 is an enlarged view taken on the line 10—10 of FIGURE 4.
FIGURE 11 is an enlarged view taken on the line 11—11 of FIGURE 4.
FIGURE 12 is a view taken on the line 12—12 of FIGURE 10.
FIGURE 13 is an enlarged view taken on the line 13—13 of FIGURE 12.

FIGURE 14 is a fragmentary view similar to the left-hand portion of FIGURE 12, but showing part of the apparatus in a different position than that illustrated in FIGURE 12, and also showing an alternative construction.

FIGURE 15 is an enlarged view taken on the line 15—15 of FIGURE 4.

FIGURE 16 is an enlarged view taken on the line 16—16 of FIGURE 5.

FIGURE 17 is an enlarged view taken on the line 17—17 of FIGURE 5, but showing the roller carriage of the apparatus in elevated position.

FIGURE 18 is a view taken on the line 18—18 of FIGURE 17.

FIGURE 19 is a view taken on the line 19—19 of FIGURE 17.

FIGURE 20 is an enlarged view taken on the line 20—20 of FIGURE 17.

FIGURE 21 is a view taken on the line 21—21 of FIGURE 20.

FIGURE 22 is an enlarged plan view of a laminated pad cover element of the device of the present invention.

FIGURE 23 is a further enlarged view taken on the line 23—23 of FIGURE 22.

FIGURE 24 is a fragmentary plan view showing details of the third dimensional traction roller carriage assembly of the apparatus of the present invention.

FIGURE 25 is an enlarged fragmentary front elevational view showing the control panel of the apparatus of the present invention.

FIGURE 26 is a schematic illustration of the pneumatic system of the apparatus of the present invention.

FIGURE 27 is a wiring diagram of said apparatus.

An orthopedic treatment table, generally designated 10, is mounted on legs 12, and is designed to support a patient 14 in supine position, as best illustrated in FIGURE 2 of the drawings. Table 10 has a head end 16 toward which the head of patient 14 may be disposed, and a foot end 18 toward which the feet of the patient may be disposed.

An elongate slotted opening 20 is formed medially longitudinally, along table 10, said slotted opening extending from a point on said table in the area where the head of the patient may be disposed to a point in the area where the buttocks of such patient may be disposed when the patient is in supine position on said table.

The patient rests on a pad 700 on table 10, said pad being hereinafter described in detail. It is preferred that a supplemental cushion 22, shaped to follow the contours of the upper portion of the thighs of the patient and to give additional support to said thighs be interposed between the patient and said pad 700. It will be recognized that other means may be provided to support the area between the patient's buttocks and ankles.

A sling-type head rest 30 is transversely suspended between the upper ends 32 of a pair of vertical posts 34 mounted adjacent head end 16 of table 10, said posts 34 being slidably disposed in vertical channel members 36, so as to be adjustable in height, and so that, preparatory to treatment, the back of the head of the patient may be placed so as to rest in and be supported by head rest 30 at a comfortable position and height. The head rest is pivotally mounted on the ends 32 of the posts 34 by any suitable means, such as blocks 37 to which the ends of head rest 30 are secured by means of a screw 38, blocks 37 and ends 32 of posts 34 having aligned threaded bores 39, in which threaded studs 40 are accommodated.

For adjustment to and maintenance of the desired height of posts 34, and consequently, of head rest 30, one face of each of posts 34 is provided with a series of indentations or detent stops 42, said detent stops being disposed along substantially the entire length of posts 34. Openings 44 are provided at a convenient height on channel members 36, and housings 46 cover said openings 44 and protrude outwardly from chanel members 36. Said housings 46 may be secured to channel members 36 by any suitable means, such as by threaded screws 47. A lever 48 is pivotally mounted on a transverse bar 49 in each of housings 46, and each of said levers 48 has a detent 50 disposed in an opening 44 in a channel member 36 so as to seat in a selected detent stop 42. Said levers 48 are biased toward a seated position of detents 50 in selected detent stops 42 by springs 51, one end 52 of each of which said springs abuts on a housing 46, and the other end 53 of each of which said springs abuts on a lever 48, preferably by mounting about a spur 54 on each lever 48. For purposes of convenient manipulation, the free ends 55 of levers 48 project outwardly, and preferably downwardly, from housings 46, through openings in the housings.

A chin strap 60 is provided, said chin strap being contoured to fit under the chin of the patient and to provide a means of application of traction to the head area of the patient in the manner hereinafter described. The sides of chin strap 60 are adjustably connected to opposite sides of head rest 30 by any suitable means, such as by straps 62 and 64, and by bead chains 66 mounted between said straps 62 and 64, standard clamping devices for bead chains (not illustrated) being provided on either straps 62 or straps 64, or both, adjustment being made to place chin strap 60 in comfortable position under the chin of patient 14.

A second pair of vertical posts 70 are mounted substantially parallel to posts 34, said posts 70 being slidably disposed in vertical channel members 72 so as to be adjustable in height. Channel members 36 and channel members 72 may be integrally formed with each other, as illustrated in the drawings, or separately formed and mounted parallel to each other, as desired. At the upper ends 74 of posts 72 there are mounted anchor means or clamping devices 76, which, as illustrated in the drawings, may be bead chain clamping means. The ends of chin strap 60 are adjustably connected to posts 70, as by bead chains 78, one end of each bead chain 78 being mounted adjacent to an end of chin strap 60, and a portion of each bead chain 78 being disposed in an anchor 76 at a point which will provide a firm but comfortable seating of chin strap 60 under the chin of patient 14 when head traction is applied.

For adjustment to and maintenance of the desired height of posts 70, and consequently, of the desired position of chin strap 60, one face of each of posts 70 is also provided with a series of indentations or detent stops 80, said detent stops 80 being disposed along substantially the entire length of posts 70. Openings 82 are provided at a convenient height on channel members 72.

For purposes of convenience of construction and operation, particularly if channel members 36 and channel members 72 are formed integrally of one piece of stock, each opening 82 is aligned with an opening 44 to form a single opening, and a single housing 46 covers each combined opening. Transverse bar 49 may then extend across said combined opening, and a lever 84 is pivotally mounted, parallel to a lever 48, in each such housing 46, each of said levers 84 having a detent similar to detent 50, the detent on each lever 84 being disposed so as to seat in a selected detent stop 80 in a post 70, said levers 84 being similarly biased toward a seated position of said detents in selected detent stops 80 by springs 51, with one end 52 of each such spring 51 abutting on a housing 46, and with the other end 53 abutting on a lever 84, again in substantially the same manner as the abutment on each lever 48, that is, by mounting about a similar spur 54 on each lever 84. The free ends 86 of levers 84 also project outwardly and downwardly, substantially parallel to free ends 55 of levers 48, housings 46.

Channels 36 and channels 72 have slotted openings 87 extending over their entire length on the sides of said channels 36 and 72 opposite the sides on which openings 44 and 82 are respectively provided. Projections 88 are formed on posts 34 and posts 70, each of said projections 88 being slidably disposed in one of said slotted openings 87 and protruding therefrom so as to provide a convenient mounting for post cross-braces hereinafter described.

Parallel slotted openings 89 are provided in table 10 adjacent head end 16 of table 10, said slotted openings 89 being spaced apart from and disposed laterally of slotted openings 20, and posts 34 and 70, with their respective channel members 36 and 72, are vertically disposed in said slotted openings 89, with the upper ends of said posts and channel members extending above the top of said table and the lower ends thereof extending below the top of said table.

A transverse bar 90 is mounted on the legs 12 of table 10 at the head end 16 of the table adjacent the lower end of said legs, and the lower ends of channel members 36 and 72 are pivotally mounted on said transverse bar 90 by any suitable means, such as by brackets or plates 91.

A cross-brace 92 is mounted on the projections 88 of each of said posts 34, preferably toward the bottom of said posts 34, and disposed so that said posts 34 will move freely as a unit in said channel members 36, and similarly a cross-brace 93 is mounted on the projections 88 of each of said posts 70, again preferably toward the bottom of said posts 70, so that these posts may also move freely as a unit in said channel members 72.

A carriage 100 is slidably mounted on table 10 adjacent the foot end 18 of the table. A cover plate 101 may be mounted on the outside end of carriage 100. The slidable mounting of the carriage on the table is attained by superimposing said carriage over an upwardly disposed, U-shaped roller support member 102 mounted on table 10, at substantially the longitudinal axis of the table. Mounted externally on the side of each leg of U-shaped roller support member 102 are a plurality of rollers 104 which are disposed in channel tracks 106 formed on the internal side surfaces of carriage 100 adjacent the bottom of each side of said carriage 100 so as to support said carriage slidably on table 10 and to prevent vertical lifting of said carriage from said table 10. On the terminal edges of the legs of said U-shaped roller support member 102 are rotatably mounted a second plurality of rollers 108 disposed so as to roll against the internal side surfaces of carriage 100 and limit lateral movement of the carriage relative to support member 102.

Mounted externally on opposite sides of carriage 100 and extending over substantially the entire length of the carriage are protruding arms 110, and said arms are enlarged at their protruding free ends to form substantially square tracks 112. Upwardly disposed U-shaped brackets 114 are provided, said brackets having downwardly directed shanks 116 formed at substantially the center of the brackets. Channels 118 are formed in shanks 116 adjacent the bottom of said shanks, said channels 118 being arranged to slidably accommodate tracks 112 and to retain brackets 114 on arms 110.

Channels 118 have slotted lateral openings 120, which slidably receive arms 110. Formed above openings 120 are notches 122, and loosely disposed in each of the notches 122 is a block 124. An aligned bore 126 is formed in each of shanks 116 and each of blocks 124, said bores 126 being threaded where they pass through blocks 124. A threaded stud 128, matable with the threads in each block 124, is rotatably disposed in each of the aligned bores 126. Said studs 128 protrude from the bores 126 at the sides of shanks 116 opposite said notches 122, and mounted on the protruding ends of each of said studs 128 is a knob 130 having a handle 132 disposed for convenient turning of the stud. A washer 134 may be interposed between each knob 130 and shank 116.

Turning of knobs 130 by means of handles 132 in one direction will cause washers 134 and blocks 124 to act as a vise, and to lock shanks 116 at any individually desired position along the length of tracks 112 by clamping the sides of said tracks. Turning of knobs 130 in the opposite direction will release said clamping and permit the movement of shanks 116 to any other desired position along tracks 112.

An end plate 180 is mounted on the inner end of carriage 100 by any suitable means, such as by screws 184, and a roller 138 is rotatably mounted at substantially the lower center of end plate 180, as by brackets 139, said roller 138 projecting below said end plate 180 and serving to slidably support carriage 100 on table 10.

A U-shaped pad 140 is disposed in each U-shaped bracket 114, said pads serving as a support for the ankles and feet of the patient.

Inverted U-shaped pads 144 are also provided, said pads 144 being designed to fit over the insteps of patient 14. Mounted at both ends of pads 144 are bead chains 146, and bead chain anchor members 148 are mounted adjacent the ends of brackets 114 so as to receive chains 146 and to provide comfortable adjustable clamping of the ankles of the patient between pads 140 and pads 144.

It will be seen from the description of the head rest and support assembly and the foot rest and support assembly hereinabove described, that prior to the application of head and foot traction to the patient, the patient may be placed in a supine position on pad 700 (which, as hereinafter described, extends generally from the cervical region to the region of the thighs), with cushion 22 comfortably arranged to support his upper thighs, his head position may then be comfortably arranged at a suitable height by adjustment of the height of head rest 30, and his chin may be firmly but comfortably held in desired position by adjustment of chin strap 60. The positions of brackets 114 and pads 140 may then be adjusted laterally along the table, dependent on the height of patient 14, so that comfortable support of the ankles and feet of the patient may be attained, and pads 144 may be selectively adjusted to rest on the insteps and provide secure and comfortable clamping of the feet and ankles.

For applying traction to the area of the lower extremities, a pressure cylinder 160 is mounted on table 10 adjacent the foot end 18 of the table.

As illustrated in the drawings, the pressure systems hereinafter described are pneumatic systems, but it will be readily apparent that hydraulic pressure systems may also be utilized.

Referring particularly to FIGURES 10 and 12 of the drawings, a convenient way of mounting cylinder 160 on table 10 is to mount one end 161 of the cylinder on a supporting bracket 162, which is disposed between the arms of U-shaped roller support member 102 adjacent foot end 18 of the table to which bracket 162 is secured by any suitable means, such as by bolts 164, said supporting bracket 162 being disposed so that carriage 100 may pass freely over supporting bracket 162 and over cylinder 160.

Slidably disposed in cylinder 160 is a piston 166 to which a piston rod 170 is affixed, said piston rod 170 protruding from the other end 168 of cylinder 160. To the free end 172 of piston rod 170 is mounted a notched piston rod extension 174, as by a screw cap 176. End plate 180 has an axial bore 186 in which the free protruding end of notched piston rod extension 174 is freely disposed. Piston rod extension 174 has a cap 188 mounted on its free end to prevent withdrawal of piston rod extension 174 from bore 186. As illustrated in FIGURE 14 of the drawings, cap 188 may also have mounted thereon a ring 189 for attaching thereto connecting means to a pelvic belt, as hereinafter described.

To adjust the position of carriage 100 on table 10 to provide a comfortable support of the feet of patients of varying height, adjustable stop means are provided on carriage 100. These adjustable stop means may comprise a chamber 190 having a closed lower end 192 and an upper open end 194 which is aligned with an opening 196 in carriage 100 adjacent end plate 180. Piston rod extension 174 freely passes through a bore 197 intermediate the said ends of chamber 190. Disposed in chamber 190 and protruding through opening 196 in carriage 100 is a plunger 200, which has a relatively narrow shank extension 201 at its lower end within said chamber 190, and a detent 202 at the lower end of said shank 201, said detent 202 being engageable with any selected notch of piston rod extension 174. A spring 204 is seated on closed end 192 of chamber 190 and on detent 202. Detent 202 is normally seated in a selected notch of piston rod extension 174. Downward pressure on plunger 200 will compress spring 204 and free detent 202 from contact with piston rod extension 174, thus permitting adjustment of the length of stroke of piston rod 170. Release of pressure on plunger 200 will return detent 202 to contact with another selected notch in piston rod extension 174.

A pneumatic pressure line 210 leads from the device's pneumatic system, hereinafter described in detail, to cylinder 160 by means of a port 212 which gives access to the interior of cylinder 160 intermediate end 168 of cylinder 160 and piston 166. A second pneumatic pressure line 214 leads from said pneumatic system to cylinder 160 by means of a port 216, which gives access to the interior of cylinder 160 intermediate end 161 of cylinder 160 and said piston 166.

Introduction of pneumatic pressure into line 210 will cause piston 166 to move to the right in cylinder 160 in the position of the device as illustrated in the drawings, and in turn, piston rod 170 and piston rod extension 174 will exert a pull on end plate 180 to cause carriage 100 to move to the right. The movement of carriage 100 to the right will, of course, also move brackets 114 to the right to apply traction to the ankles of patient 14, the amount of such traction being determined by the controlled amount of pressure introduced into line 210.

When it is desired to relieve such traction, the flow of pressure in line 210 is cut off in the manner hereinafter described, and pneumatic pressure is then introduced into line 214. This will cause piston 166 to move to the left in cylinder 160. In turn, piston rod 170 and piston rod extension 174 will move to the left, exerting a push on plate 180 and causing carriage 100 to move to the left to relieve traction on the lower extremities of patient 14.

Traction is applied to the head area of patient 14 by means of pneumatic pressure applied to posts 34 and 70. To accomplish this head traction, a second pneumatic pressure cylinder 300 is mounted preferably under the top of table 10, substantially at the center of head end 16 of table 10. For convenience in mounting, one end 302 of cylinder 300 may protrude beyond head end 16 of table 10, and may be enclosed in a housing 304 and mounted on a transverse bar 305 in such housing. The other end 306 of cylinder 300 is disposed inwardly. Slidably disposed in cylinder 300 is a piston 310, to which a piston rod 312 is affixed, said piston rod 312 protruding from end 306 of cylinder 300. The free end 314 of piston rod 312 is attached to a cross-plate 316, which in turn is attached to posts 34 and posts 70.

Mounting of end 314 of piston rod 312 to cross-plate 316 may be accomplished by any suitable means, such as by a strap 317 mounted on cross-plate 316, said strap 317 having a grooved end 318, end 314 of piston rod 312 being disposed in said groove 318 and secured therein as by cotter pin 319.

A pneumatic pressure line 330 leads from the device's pneumatic system to cylinder 300 by means of a port 332 which gives access to the interior of cylinder 300 intermediate end 306 of cylinder 300 and piston 310. A second pneumatic pressure line 334 leads from said pneumatic system to cylinder 300 by means of a port 336 which gives access to the interior of cylinder 300 intermediate the end 302 of cylinder 300 and said piston 310.

Introduction of pneumatic pressure into line 330 will cause piston 310 to move to the left in cylinder 300, and in turn, piston rod 312 will move to the left and exert a pull on cross-plate 316 to move posts 34 and 70 to the left, thereby applying traction to the head area of patient 14 by reason of the movement of head rest 30 and chin strap 60 to the left, attached as they are to posts 34 and posts 70, respectively. The amount of such head traction will, of course, be determined by the controlled amount of pressure introduced into line 330.

When it is desired to relieve such head traction, the flow of pressure in line 330 is cut off, in the manner hereinafter described, and pneumatic pressure is then introduced into line 334. This will cause piston 310 to move to the right in cylinder 300, and in turn, piston rod 312 will move to the right, causing cross-plate 316 and posts 34 and 70, to which it is attached, and chin strap 60 and head rest 30, to move to the right, thus relieving head traction on patient 14.

Mounted on table 10, disposed longitudinally thereof, and preferably suspended from the top of the table adjacent the foot end 18 of the table, is a third pneumatic pressure cylinder 400. This cylinder may be mounted on the table by any suitable means, such as by brackets 402, and has an end 404 adjacent foot end 18 of table 10, and an end 406 disposed inwardly on table 10. A piston 408 is slidably disposed in cylinder 400, and a piston rod 410 is affixed to piston 408 and protrudes from end 406 of the cylinder. Piston rod 410 has a free end 412.

A pneumatic pressure line 414 leads from the device's pneumatic system to cylinder 400 by means of a port 416 which gives access to the interior of cylinder 400 intermediate end 404 of cylinder 400 and piston 408, and a second pneumatic pressure line 418 leads from said pneumatic system to cylinder 400 by means of a port 420 which gives access to the interior of cylinder 400 intermediate end 406 of the cylinder and said piston 408.

Introduction of pneumatic pressure into line 414 will cause piston 408 to move to the left and extend piston rod 410. When flow of pressure in line 414 is cut off and pneumatic pressure is then introduced into line 418, piston 408 will move to the right and retract piston rod 410.

A pair of parallel U-shaped tracks 500 is mounted on the under side of the top of table 10, said tracks 500 being disposed parallel to the longitudinal axis of the table with one track on either side of the slotted opening 20 in the table, said U-shaped tracks 500 having their legs inwardly disposed.

A carriage 502 has side members 504, and mounted adjacent to the upper edge of said side members 504 and protruding outwardly therefrom are a plurality of rollers 506, said rollers 506 being disposed between the inwardly directed legs of the U-shaped tracks so as to slidably suspend carriage 502 from table 10. In lieu of separate rollers 506 on opposite sides of carriage 502, protruding roller bars may be provided, the ends of said roller bars serving the same function as separate rollers. Carriage 502 has an outwardly disposed front end plate 508 and an inwardly disposed rear end plate 510. Free end 412 of piston rod 410 is attached to rear end plate 510 of carriage 502 by any suitable means, such as by coupling 511, and thus reciprocal movement of piston rod 410 will cause reciprocal movement of carriage 502 along tracks 500.

A pair of spider support members 520 are provided, each of said spider support members 520 having an upwardly directed central body portion 522 with an upper end 524. Extending rearwardly from the central body portion 522 of each of these spider support members is an arcuate arm 526, and extending downwardly from such central body portion is a second arcuate arm 528. Said spider support members 520 are pivotally mounted parallel to each other within carriage 502, said pivotal mounting being made adjacent the free ends of the arms 526 and adjacent the upper end of rear end plate 510 of carriage 502, so that the spider support members are free to swing arcuately upwardly and downwardly as a unit within carriage 502. Pivotal mounting of spiders 502 may be accomplished by mounting them on a transverse bar 527 which spans side members 504 of carriage 502 adjacent rear end plate 510.

A walking beam 540 is mounted at substantially its center and adjacent the upper ends 524 of central body portions 522 of spiders 520, said walking beam 540 being pivotally suspended between said spiders 520, by any suitable means, as by pivotal mounting on a transverse bar or axle 542. Shock absorbing rings 543 are interposed between axle 542 and walking beam 540, and hence between the walking beam and said spider support members 520, so that vibration applied to walking beam 540, in the manner hereinafter described, will pass to the rollers hereinafter described, but will be absorbed by rings 543 and will not be communicated to the rest of the device.

Pivotally externally mounted adjacent the four corners of said walking beam 540 are rollers 544, which may be mounted on transverse axles 546, and said rollers 544 are covered by enlarged tires 547 of suitable flexible, resilient material, such as rubber. Said rollers 544, with their tires 547, are disposed in pairs on opposite sides of walking beam 540, so as to reciprocally roll in a line on opposite sides of the spinal column of patient 14 upon reciprocal movement of carriage 502 in the manner hereinafter described.

A downwardly directed yoke 548 is formed at each end of walking beam 540, said yokes 548 being disposed substantially parallel to each other. The lower ends of said yokes 548 are U-shaped, having arms 549. Transversely suspended between said yokes 548 is a vibrator motor 560 having a housing 561, the ends of said housing 561 being disposed between the arms 549 of the yokes 548, and said motor housing 561 being mounted at its ends on said yokes 548 by any suitable means, such as by screws 562.

Motor 560 has a rotating motor shaft 564 within housing 561, on which shaft 564 is eccentrically mounted a vibration governor generally designated 570. Said governor 570 has a hollow main governor shaft 572 which intersects motor shaft 564 and is mounted on said motor shaft 564 by means of a bore 573 in shaft 572 adjacent the upper end of shaft 572 in which motor shaft 564 is disposed, shaft 572 being secured on motor shaft 564 by a set screw 574 disposed within said hollow shaft 572.

An arcuate weight 576 is mounted on the lower free end of shaft 572 and disposed so as to rotate freely within said housing 561 upon rotation of motor shaft 564.

A hollow tube 580 is slidably mounted on shaft 572. Said tube 580 is cut away on its sides so as to form elongate slots in which motor shaft 564 is freely disposed. One end 581 of tube 580 is flanged outwardly, said flange being designated 582. Flange 582 abuts against weight 576, and preferably is disposed in a well 584 formed in the weight. Flange 582 serves as a seat for one end of a spring 586 mounted circumferentially about the tube 580, the other end of said spring 586 abutting against motor shaft 564, said spring being disposed so as to bias flange 582, and consequently, tube 580, into abutment with weight 576.

The other end 587 of tube 580 is preferably closed, and is disposed on the opposite side of motor shaft 564 from end 581. Mounted on said end 587 of tube 580 is a fly-shoe weight 588, disposed so as to be centrifugally actuated on rotation of motor shaft 564. Said fly-shoe weight 588 is lighter than weight 576. Fly-shoe weight 588 is also preferably arcuate and disposed so as to rotate freely within housing 561 upon rotation of motor shaft 564 even when, due to centrifugal force, tube 580 is at the limit of its extended position.

The action of governor 570 is such that when motor shaft 564 is turning over relatively slowly, fly-shoe weight 588 will not be extended substantially beyond motor shaft 564, but weight 576, in its fixed position, will be extended substantially beyond motor shaft 564, and a definite, relatively heavy, vibrator beat will be created and transmitted to walking beam 540, and thus to rollers 544. As the revolutions of motor shaft 564 speed up, centrifugal force will cause tube 580 and fly-shoe weight 588 to move outwardly from shaft 564, against the biasing action of spring 586, and as fly-shoe weight 588 moves toward a balanced position with weight 576, the vibratory throb will decrease in intensity.

Because fly-shoe weight 588 is lighter than weight 576, fly-shoe weight 588 never reaches a balanced position with weight 576, and vibration throb is never eliminated, but by reason of the action hereinabove set forth, said vibration throb is controlled.

A fourth pneumatic pressure cylinder 600 is provided, said cylinder 600 being pivotally mounted at one end 602 thereof to rear end plate 510 of carriage 502, preferably adjacent the bottom of the carriage. Cylinder 600 has a rear end 604. A piston 606 is slidably disposed in cylinder 600, and a piston rod 608 is affixed to piston 606 and protrudes from end 602 of the cylinder. Piston rod 608 has a free end 610.

A transverse block 612 is pivotally mounted on and disposed between the free ends of arcuate arms 528 of spider support members 520, and free end 610 of piston rod 608 is connected to said block 612 by any suitable means, such as by a coupling 614 and a threaded stud 616.

A pneumatic pressure line 620 leads from the device's pneumatic system to cylinder 600 by means of a port 622 which gives access to the interior of cylinder 600 intermediate end 604 of cylinder 600 and piston 606. Introduction of pneumatic pressure into line 620 will cause piston 606 to move to the left and extend piston rod 608, which in turn will push on block 612 and cause arcuate arms 528 to move to the left and upwardly, thus causing body portions 522 of spiders 520 to move upwardly, carrying with them walking beam 540 and rollers 544. Carriage 502 is slidably suspended from tracks 500 under slotted opening 20 in table 10. Consequently, the upward movement of walking beam 540 and rollers 544 will project them through slotted opening 20, and through an aligned slotted opening in pad 700, so that controlled rolling traction pressure is exerted against opposite sides of the spinal column of patient 14.

The length of travel of carriage 502 along tracks 506, and under slotted opening 20 in table 10, is selectively controlled by a protruding tripper arm 630 mounted on one side member 504 of carriage 502 and disposed so as to contact tripper buttons on air release valves in the manner hereinafter described, in detail.

The pad 700 is disposed on table 10 between posts 34 and 70 and carriage 100, said pad being placed so as not to interfere with the free traction application of said posts 34 and 70 and of carriage 100. Said pad is elongate and extends across substantially the entire width of table 10. Pad 700 is designed to provide support for the patient from the upper neck area to the thigh area, end 702 of the pad being disposed in the neck area, and end 704 of the pad being disposed in the thigh area, and supporting cushion 22. The body 706 of said pad is formed of any suitable elastomer material, such as resilient sponge rubber, and the pad has an outer cover 708 of any suitable material, such as flexible leather or a plastic material, such cover 708 extending over substantially the entire top, sides, and both ends 702 and 704 of the pad, but not over the bottom thereof except, if desired for a firm fitting, over a relatively small portion of the bottom of the pad adjacent end 704.

Pad 700 has an elongate slotted opening 710 through the body 706 thereof, said slotted opening 710 extending longitudinally, axially from end 702 of the pad to a point approximate the buttocks area of patient 14, said slotted opening 710 being aligned with slotted opening 20 in table 10 and disposed so as to freely receive walking beam 540 and rollers 544 when said walking beam and rollers are projected upwardly through the slotted opening 20 in table 10 in the manner hereinabove described.

The top of slotted opening 710 is covered by a flexible, resilient cover 712 which is mounted on body 706 of said pad 700 by any suitable means, such as by a rubber cement, and is supported in relatively flat position by said body 706. Said cover 712 receives the thrust and vibration from rollers 544 and transmits them through the outer cover 708 to the spinal area of patient 14.

Cover 712 is laminated, as best illustrated in FIGURE 23 of the drawings, and comprises an outside layer of flexible material 714, such as rubber, a layer of electric insulating material 716, a heat generating material such as carbon cloth 718, arranged in strips in a flat serpentine configuration, as best illustrated in FIGURE 22 of the drawings; a second layer of electric insulating material 720, and a second outside layer of flexible material 722.

Electric terminals 724 and 726 are mounted at opposite ends of said serpentine strips of carbon cloth 718. An electric line 728 is connected to said terminal 724, while an electric line 730 is connected to said terminal 726, said lines 728 and 730 leading to the electric system of the device, hereinafter described in detail.

Table 10 has a depending side panel 740, on which is mounted a control panel generally designated as 750.

Mounted on said control panel 750 is a pressure regulator valve 752 connected to the device's pneumatic system and designed to regulate pneumatic pressure in cylinder 160. Said valve 752 is adjustably controlled by a knob 756. An on-and-off valve 758 is located on panel 750 adjacent knob 756. A pressure gauge 754 is also disposed on panel 750, so as to indicate the volume of pneumatic pressure in the pneumatic pressure system connected to cylinder 160 and applying traction to the lower extremities of patient 14.

Also mounted on said control panel 750 is a second pressure regulator valve 770 connected to the device's pneumatic system and designed to regulate pneumatic pressure in cylinder 300. Said valve 770 is adjustably controlled by a knob 774. A second on-and-off valve 778 is located on panel 750 adjacent knob 774. A second pressure gauge 780 is also disposed on panel 750 so as to indicate the volume of pneumatic pressure in the pneumatic pressure system connected to cylinder 300 and applying traction to the head area of patient 14.

Also mounted on said control panel 750 is a third pressure regulator valve 790 connected to the device's pneumatic system and designed to regulate pneumatic pressure in cylinder 600. Said valve 790 is adjustably controlled by a knob 792. A third pressure gauge 794 is also disposed on panel 750 so as to indicate the volume of pneumatic pressure in the pneumatic pressure system connected to cylinder 600 and applying third dimensional traction to the spinal column of patient 14.

A motor 800 drives a compressor 802, to which it is connected by any suitable drive means, such as a belt and pulley assembly 804, a gear train, or a direct drive. Motor 800 and compressor 802 may be mounted on a platform 806, which is suspended below the top of table 10 by spring shock absorbers 808 so as to decrease or eliminate the transmission of vibration from motor 800 to table 10. Said platform 806 is suspended adjacent to foot end 18 of table 10. A fan 810 is also driven by motor 800. Also mounted on table 10 at the foot end is a radiator 812, which is positioned relative to fan 810 so as to be cooled by the fan. An air line 814 leads from compressor 802 to radiator 812.

An air line 820 leads from radiator 812 to a manifold 822, said air line 820 having mounted thereon, intermediate said radiator 812 and said manifold 822, a water cleaner 824 and an oil dripper 826.

An air line 830 leads from manifold 822 to pressure regulator valve 752. An air line 832 leads from pressure regulator valve 752 to on-and-off valve 758. Pneumatic pressure line 210, which, as previously stated, is connected at one end thereof to port 212 in cylinder 160, is also connected at its other end to said on-and-off valve 758, and pneumatic pressure line 214, which, as previously stated, is connected at one end thereof to port 216 in cylinder 160, is also connected at its other end to said on-and-off valve 758. For smoothness of operation of piston 166 in cylinder 160, and to prevent jerking shock at the ends of the reciprocal strokes of piston 166, pressure relief orifices 759 and 760 are mounted on lines 210 and 214, respectively. An air line 761 also leads from pressure regulator valve 752 to pressure gauge 759.

A second air line 840 leads from manifold 822 to pressure regulator valve 770. An air line 842 leads from pressure regulator valve 770 to on-and-off valve 778. Pneumatic pressure line 334, which, as previously stated, is connected at one end thereof to port 336 in cylinder 300, is also connected at its other end to said on-and-off valve 778, and pneumatic pressure line 330, which, as previously stated, is connected at one end thereof to port 332 in cylinder 300, is also connected at its other end to said on-and-off valve 778. For smoothness of operation of piston 310 in cylinder 300, and to prevent jerking shock at the ends of the reciprocal strokes of piston 310, pressure relief orifices 782 and 784 are mounted on lines 334 and 330 respectively. An air line 786 also leads from pressure regulator valve 770 to pressure gauge 780.

A third air line 850 leads from manifold 822 to pressure regulator valve 790. Air line 620, which, as previously stated, is connected at one end thereof to port 622 in cylinder 600, is also connected at its other end to pressure regulator valve 790. As illustrated in FIGURE 5 of the drawings, in lieu of a single air line 620, because cylinder 600 will travel along the longitudinal axis of table 10 by reason of being mounted on carriage 502, it may be convenient to divide air line 620 into two air lines 624 and 626, and join said air lines 624 and 626 at a junction box 628 mounted on table 10. Thus, instead of allowing for travel slack along the entire length of a single air line 620, allowance for travel slack need only be made in shorter air line 624.

An air line 860 leads from manifold 822 to a port 861 in a cylinder 862, said port 861 being disposed at approximately the longitudinal center of said cylinder 862, and disposed so as to give pneumatic air pressure access to the interior of cylinder 862. As previously described, air line 414 is mounted at one end thereof to a port 416 in cylinder 400. The other end of said air line 414 is attached to a port 863 in cylinder 862, said port 863 being disposed preferably on the opposite side of cylinder 862 from port 861, and intermediate the longitudinal center of said cylinder 862 and one end 864 of said cylinder 862.

As previously described, air line 418 is mounted at one end thereof to a port 420 in cylinder 400. The other end of said air line 418 is attached to a port 865 in cylinder 862, said port 865 being disposed preferably on the opposite side of cylinder 862 from port 861, and intermediate the longitudinal center of said cylinder 862 and the other end 866 of said cylinder 862. Exhaust ports 867 and 868 are provided in said cylinder 862, exhaust port 867 being disposed intermediate port 863 and end 864 of cylinder 862 and exhaust port 868 being disposed intermediate port 865 and end 866 of cylinder 862.

For convenience in controlling and limiting the volume of exhaust from cylinder 862, exhaust port 867 may have attached thereto an exhaust line 869 which has a relatively narrow throat portion 870, and exhaust port 868 may have attached thereto an exhaust line 871 which has a relatively narrow throat portion 872.

A pair of spaced-apart air release valves 873 and 874 are mounted on panel 750, in the manner hereinafter described. An air line 875 leads from air release valve 873 to a port 876 in end 866 of cylinder 862, and an air line 877 leads from air release valve 874 to a port 878 in end 864 of cylinder 862.

Slidably disposed in cylinder 862 is a hollow, elongate, spool-type, piston 879, which is formed with four protruding annular rings. One annular ring 880 is at the end of piston 879 which is disposed toward end 864 of cylinder 862; another annular ring 881 is at the end of piston 879 which is disposed toward end 866 of cylinder 862; and the other two rings 882 and 883 are spaced apart substantially equidistant from each other and from rings 880 and 881. A hollow passage 884 is disposed between rings 882 and 883 and provides air passage from the periphery of substantially the center of piston 879 to the hollow interior of said piston 879.

An elongate, substantially U-shaped member 885 is mounted on and suspended from panel 750, by any suitable means, such as by forming the bottom of panel 750 into an inwardly directed L-configuration and securing member 885 to panel 750 by a screw 886. The legs of member 885 are directed inwardly to form a track 887. Each of the air valves 873 and 874 has rollers 888 rotatably mounted thereon, and said rollers 888 being disposed between the legs of member 885 so as to permit the free movement of air release valves 873 and 874 on the track 887. To retain rollers 888 in track 887, rollers 888 may be formed with centrally disposed arcuate grooves 889, which accommodate corresponding ridges 890 and 891 formed in the legs of member 885.

Each of said air release valves 873 and 874 has a body member 892 disposed below member 885, and an extension 893 disposed below said body member 892, said extension 893 being secured to body member 892 in suspended position by a spring hinge 894. Body member 892 is hollow, and disposed within it is a spring-biased collar member 895, to which is mounted a braking plate 896, collar 895 and braking plate 896 being disposed so that braking plate 896 abuts on the bottom of member 885 to secure air release valves 873 and 874 at selected positions along track 887.

A spring-biased plunger 898 is mounted within collar 895, and has an upper annular flange 899 which abuts on an internal shoulder 1000 on collar 895. Plunger 898 has a shank member 1002 extending downwardly therefrom through an opening in the bottom of body member 892 and through an opening in the top of extension 893 to a laterally disposed, elongate, slotted opening 1004 in extension 893. An annular flange 1006 is mounted at the lower end of said shank member 1002, and disposed in slotted opening 1004.

When it is desired to move air release valves 873 and 874 along track 887, pressure on extension 893 against the action of spring hinge 894 will draw plunger 898 downwardly, in turn drawing collar 895 and braking plate 896 downwardly and clear of member 885, thus permitting free movement of air release valves 873 and 874 along said track 887.

When new desired positions are attained, release of pressure on extension 893 will allow spring-biased plunger 898 and spring-biased collar 895, with braking plate 896 thereon, to rise, bringing braking plate 896 into contact with member 885 to secure air release valves 873 and 874 in the new selected positions.

Member 885 may be calibrated, as illustrated in FIGURE 25, to indicate desired positions along track 887.

If desired, a stop plate 1008 may be mounted on air release valve 874, as illustrated in FIGURE 24 of the drawings, or alternately on air release valve 873, said stop plate 1008 being disposed so as to limit the relative travel of air release valve 873 and air release valve 874 toward each other and prevent their meeting.

Air release valves 873 and 874 have protruding tripper buttons 1010 and 1012 respectively, said buttons being disposed so as to be alternately tripped by tripper arm 630 on carriage 502, contact of pressure arm 630 with tripper button 1010 releasing pressure in air release valve 873, and contact of tripper arm 630 with tripper button 1012 releasing pressure in air release valve 874.

Cylinder 862 operates to control the movement of carriage 502 by controlling the reciprocal movement of piston 410, as air under pressure is introduced into cylinder 862 through part 861 when piston 879 is disposed toward end 864 of cylinder 862. Said air under pressure will pass through air line 414 to cylinder 400 between piston 408 and end 404 of cylinder 400, forcing piston 408 and piston rod 410 to the left to move carriage 502 to the left and upwards along the spinal column of patient 14. At the same time, air under pressure will pass through passage 884 and through the hollow center of piston 879 to the left side of cylinder 862 adjacent end 866 to maintain piston 879 in that position.

When tripper arm 630 on carriage 502 strikes tripper button 1010 on air release valve 873, pressure on the left side of piston 879 will be relieved, and pressure in air line 877 from air release valve 874 will move piston 879 to the left. Air under pressure will then move from air line 860, through port 865, into air line 418 to move piston 408 in cylinder 400 and piston rod 410 to the right, thus pulling carriage 502 to the right, and applying third dimensional traction and vibration to the lower portion of the spinal column of patient 14, while air passing through passage 884 will proceed through the hollow core of piston 879 to the right side of cylinder 862 toward end 864 of cylinder 862 to retain piston 879 to the left.

When tripper arm 630, carried by carriage 502, contacts tripper button 1012 on air release valve 874, the operation of piston 879 in cylinder 862 will be reversed to reverse the travel of carriage 502 and move it upwardly along the spinal column of patient 14.

Referring to the wiring diagram illustrated in FIGURE 27 of the drawings a power source is provided, such power source having terminals 900, 902 and 904. A line 906 leads from terminal 900 to a suitable ground 908; a line 910 leads from terminal 902 to a junction box 912; and a line 914 leads from terminal 904 to said junction box 912.

A line 916 leads from junction box 912 to motor 800, and a line 918 leads from motor 800 to a second junction box 920.

A line 930 leads from junction box 912 to a timer 932 which is mounted on panel 750, as shown in FIGURE 25 of the drawings. From timer 932 a line 934 leads to junction box 920.

Timer 932 controls the entire electrical circuit of the device. It must be turned on to start the electrical system, and at the close of its cycle, or sooner if manually readjusted, it breaks the main circuit of the system to shut off the operation of the device.

Line 728, which, as previously stated, and as illustrated in FIGURE 22 of the drawings, is connected at one end thereof to carbon cloth 718 at terminal 724, is connected at its other end to junction box 912. Line 730, also previously described and also illustrated in FIGURE 22 of the drawings, leads from terminal 726 on carbon cloth 718 to a rheostate 940, which is mounted on panel 750 as shown in FIGURE 25 of the drawings. A line 942 leads from rheostat 940 to junction box 920.

A line 950 leads from junction box 912 to vibrator motor 560, and a line 952 leads from motor 560 to a second rheostat 960 which is also mounted on panel 750, as shown in FIGURE 25 of the drawings. A line 962 leads from rheostat 960 to junction box 920.

The method of the present invention is applied, and the apparatus of the present invention operates as follows:

Patient 14 is placed on table 10 and arranged in supine position, resting on pad 700, with cushion 22 supporting his upper thighs. His head is placed in head rest 30, and the height of posts 34 is adjusted so that the head will rest comfortably in line with the torso. Chin strap 60 is then adjusted in position by adjustment of the height of posts 70 and the length of bead chains 66, so that chin strap 60 is comfortably but firmly positioned on the chin.

The ankles of patient 14 are then placed on pads 140, the position of brackets 114 on tracks 112 being individually adjusted according to the length of the legs of the patient to firmly support the ankles close to the heels. If the patient is more than normally tall, the position of carriage 100 is similarly adjusted for the same purpose. Pads 144 are then placed over the insteps of the patient, and bead chains 146 are positioned in anchor members 148 so that the ankles of the patient will be firmly but comfortably held in position.

The area along the spinal column which is to be treated is determined, and air release valves 873 and 874 are selectively positioned so that the length of travel of carriage 502 may be selectively determined in order to apply three-dimensional traction and vibration to a selected area. For instance, if three-dimensional traction, and vibration and heat are to be applied along substantially the entire length of the spinal column, air relief valves 873 and 874 are positioned adjacent the extreme outer limits of their travel, thus effecting a long reciprocal stroke on piston rod 410, and a long travel of carriage 502, and consequently, of rollers 544. If on the other hand a smaller selected area of the spinal column, such as the localized area of a subluxated disc, alone is to be treated, the positions of air release valves 873 and 874 are adjusted accordingly, with air release valves 873 and 874 brought into closer proximity to each other, thus shortening the reciprocal stroke of piston rod 410 when the apparatus is in operation.

The amount of heat which is to be applied to the patient is determined and set on rheostat 940, and the intensity of the vibratory beat which is to be applied to the area to be treated is also determined and set on rheostat 960. The time during which said heat and vibratory beat are to be applied is also determined and set on timer 932.

On-and-off valves 758 and 778 are then manipulated to the "on" position, and by turning knobs 756, 774 and 792, predetermined traction is applied through the pneumatic system to the feet, to the head, and to the spinal column of patient 14. When the predetermined time of application of the therapeutic features of the apparatus has elapsed, timer 932 will act to shut off the electrical system of the apparatus, and the pneumatic system may be disengaged by manipulation of on-and-off valves 758 and 778 to return the apparatus to dormant status.

If for any reason it is undesirable, impractical or impossible to apply traction to the area of the ankles of any particular patient 14, a standard pelvic traction belt may be applied to the pelvic area of the patient, and said pelvic traction belt (not illustrated) may be connected by adjustable means, such as a strap, to ring 189 for application of traction to the pelvic area instead of the area of the ankles.

Furthermore, although a chin strap 60 is herein described, it will be understood that if for any reason it is undesirable, impractical, or impossible to use a chin strap on any particular patient 14, a forehead strap may be substituted therefor.

Addtionally, throughout this specification and the claims hereof, the application of the third dimensional traction force is stated to be "vertical," the intention being to describe the application in that general direction when the patient is lying in a generally horizontal supine position, but it will be understood that reference is made to the application of said force in a direction normal to the plane of the back of patient 14, even if he is positioned in a tilted position.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent methods and devices.

What is claimed is:

1. Apparatus for concurrently applying three-dimensional therapeutic traction to the human body, which comprises: a table for statically supporting the torso of a patient in a supine position thereon; a pair of parallel channel members vertically disposed in parallel, longitudinally disposed, slotted openings in said table, said openings being spaced apart from each other and disposed on opposite sides of said table adjacent one end thereof, one of said channel members extending above each of said slotted openings, said channel members being rotatably mounted on said table below said slotted openings, and said channel members being transversely connected to each other so as to be longitudinally movable in said slotted openings as a unit; vertical posts slidably disposed in said channel members; means on said channel members for adjusting the height of said posts relative to said table and securing said posts at selected heights: a sling-type head rest secured to and disposed between said posts and adapted to receive the head of the patient and maintain said head in a comfortable position; means associated with said posts and said head rest for securing an adjustable chin strap under the chin of said patient; means for selectively moving said channels and posts in the slotted openings in said table so as to apply traction to the head area of said patient by assistance of said chin strap; adjustable means on said table for supporting the lower extremities of the patient in a comfortable position; means for moving said support means for the lower extremities so as to simultaneously apply traction to said lower extremities; means for simultaneously applying a vertical traction force to a selected section of the spinal column of the patient in a traveling, longitudinally reciprocal and laterally restricted path parallel to said spinal column; means for applying a controlled rhythmic, vibratory beat to said vertical traction force; and means for application of said vertical traction force and said rhythapplication of said vertical traction force an dsaid rhythmic, vibratory beat.

2. Apparatus for concurrently applying three-dimensional therapeutic traction to the human body, as defined in claim 1, wherein the means on said channel members for adjusting the height of said posts relative to said table and securing said posts at selected heights comprises: a series of detent stops disposed along substantially the entire length of one side of said posts; a lever arm pivotally mounted on each of said channel members adjacent an opening in each of said channel members facing said post detent stops; and a detent on each of said lever arms adapted to be seated in selected detent stops on said posts.

3. Apparatus for concurrently applying three-dimensional therapeutic traction to the human body, as defined in claim 2, wherein said lever arms are spring biased toward a seated position in said selected detent stops.

4. Apparatus for concurrently applying three-dimensional therapeutic traction to the human body, as defined in claim 2, including projections on said posts, said projections being disposed in slotted openings extending over substantially the entire length of said channel members; and a cross-brace mounted on said post projections, extending from the projection on one post to the projection on the other post, and disposed so that said posts may be slidably moved in said channel members integrally as a unit.

5. Apparatus for concurrently applying three-dimensional therapeutic traction to the human body, as defined in claim 4, including a second pair of parallel channel members vertically disposed in the slotted openings in said table contiguous to said first pair of channel members and substantially co-extensive therewith, said second pair of channel members being similarly rotatably mounted on said table below said slotted openings, and said second pair of channel members being similarly transversely connected to each other so as to be longitudinally movable in said slotted openings as a unit; a second pair of vertical posts slidably disposed in said second pair of channel members, the ends of said chin strap being secured to the upper ends of said second pair of posts, and said chin strap being disposed between said second pair of posts; means on said second pair of channel members for adjusting the height of said second pair of posts relative to said table and securing said second pair of posts at selected heights; and means for selectively moving said second pair of channels and posts in the slotted openings in said table together with said first pair of channels and posts.

6. Apparatus for concurrently applying three-dimensional therapeutic traction to the human body, as defined in claim 5, wherein the means on said second pair of channel members for adjusting the height of said second pair of posts relative to said table and securing said second pair of posts at selected heights comprises: a series of detent stops disposed along substantially the entire length of one side of said posts; a lever arm pivotally mounted on each of said channel members adjacent an opening in each of said channel members facing said post detent stops; and a detent on each of said lever arms adapted to be seated in selected detent stops on said posts.

7. Apparatus for concurrently applying three-dimensional therapeutic traction to the human body, as defined in claim 6, wherein said lever arms are spring biased toward a seated position in said selected detent stops.

8. Apparatus for concurrently applying three-dimensional therapeutic traction to the human body, as defined in claim 6, including projections on said posts, said projections being disposed in slotted openings extending over substantially the entire length of said channel members; and a cross-brace mounted on said post projections, extending from the projection on one post to the projection on the other post, and disposed so that said posts may be slidably moved in said channel members integrally as a unit.

9. Apparatus for concurrently applying three-dimensional therapeutic traction to the human body, which comprises: a table for statically supporting the torso of a patient in a supine position thereon; a sling-type head rest adapted to receive the head of the patent and maintain said head in a comfortable position; a pair of parallel posts supporting said head rest therebetween, said posts being vertically disposed in parallel, longitudinally disposed, slotted openings in said table, said openings being spaced apart from each other and disposed on opposite sides of said table adjacent one end thereof, said posts being rotatably supported on said table below said slotted openings, and said posts being transversely connected to each other so as to be longitudinally movable in said slotted openings as a unit; means for adjusting the height of said posts relative to said table and securing said posts at selected heights; means associated with said posts and said head rest for securing an adjustable chin strap under the chin of said patient; a pneumatic pressure cylinder and piston assembly mounted on said table and connected to said posts for selectively moving said posts in the slotted openings in said table so as to apply traction to the head area of said patient by assistance of said chin strap; adjustable means on said table for supporting the lower extremities of the patient in a comfortable position; means for moving said support means for the lower extremities so as to simultaneously apply traction to said lower extremities; means for simutaneously applying a vertical traction force to a selected section of the spinal column of the patient in a traveling, longitudinally reciprocal and laterally restricted path parallel to said spinal column; and means for applying a controlled rhythmic, vibratory beat to said vertical traction force.

10. Apparatus for concurrently applying three-dimensional therapeutic traction to the human body, which comprises: a table for statically supporting the torso of a patient in a supine position thereon; adjustable means on said table for independently supporting the head of the patient in a comfortable position; adjustable means associated with said head support means for applying a gentle longitudinal force to the head area of the patient in a direction to apply traction to the spinal column of the patient; a carriage slidably mounted for longitudinal axial movement on the table adjacent the end of the table at which the feet of the patient are disposed; padded support brackets adjustably mounted on said carriage so as to receive and support the ankles of the patient; clamping pads associated with said brackets and adapted to secure the ankles of the patient in said padded brackets; a pneumatic pressure cylinder and piston assembly mounted on said table and connected to said carriage for selectively moving said carriage axially along said table so as to apply traction to the lower extremities of the patient in a direction opposite to the direction of the application of traction force to the head area; means for simultaneously applying a vertical traction force to a selected section of the spinal column of the patient in a traveling, longitudinally reciprocal and laterally restricted path parallel to said spinal column; means for applying a controlled rhythmic, vibratory beat to said vertical traction force; and means for applying heat to the area of the spinal column during application of said vertical traction force and said rhythmic, vibratory beat.

11. Apparatus for concurrently applying three-dimensional therapeutic traction to the human body, which comprises: a table for statically supporting the torso of a patient in a supine position thereon; adjustable means on said table for independently supporting the head of the patient in a comfortable position; adjustable means associated with said head support means for applying a gentle longitudinal force to the head area of the patient in a direction to apply traction to the spinal column of the patient; adjustable means on said table for independently supporting the lower extremities of the patient in a comfortable position; means for simultaneously applying a gentle longitudinal force to said lower extremities in a direction opposite to the direction of the application of the force applied to the head area, to apply traction to the spinal column in said opposite direction; a carriage slidably suspended under the top of the table and aligned with an elongate slotted opening formed longitudinally, axially along said table, said opening extending generally from a point on said table in the area where the head of the patient is disposed to a point in the area where the buttocks of the patient are disposed, said carriage being reciprocally movable along substantially the entire length of said opening; a walking beam rotatably mounted on said carriage so as to be moved upwardly through said opening in the table; a plurality of rollers of flexible, resilient material rotatably mounted on said walking beam adjacent opposite ends of said walking beam and adapted to press upon a selected section of the spinal column of the patient in a longitudinally reciprocal and laterally restricted path parallel to said spinal column so as to apply vertical traction force thereto; means for reciprocally moving said carriage along the opening in said table; means for selectively moving said walking beam and rollers upwardly; means for applying a controlled rhythmic, vibratory beat to said vertical traction force; and means for applying heat to the area of the spinal column during application of said vertical traction force and said rhythmic, vibratory beat.

12. Apparatus for concurrently applying three-dimensional therapeutic traction to the human body, as defined in claim 11, wherein the means for reciprocally moving said carriage along the opening in the table comprises: a reciprocating pneumatic cylinder and piston assembly mounted on said table; and a piston rod protruding from said assembly and connected at its free end to said carriage.

13. Apparatus for concurrently applying three-dimensional therapeutic traction to the human body, as defined in claim 11, wherein the means for selectively moving said walking beam and rollers upwardly comprises: a pair of spaced-apart, parallel spider support members, said spiders having upwardly directed central body portions, rearwardly extending arcuate arms, and downwardly extending arcuate arms, said spiders being joined together and disposed internally in said carriage, said spiders being pivotally mounted on said carriage adjacent the free ends of said rearwardly extending arcuate arms, and said walking beam being pivotally mounted between said spiders adjacent the upper ends of the central body portions of said spiders; and a pneumatic cylinder and piston assembly mounted on said carriage and connected to said spiders adjacent the lower end of said downwardly extending arcuate arms so as to rotatably swing said spiders and move said walking beam and rollers upwardly upon actuation of said pneumatic cylinder and piston assembly.

14. Apparatus for concurrently applying three-dimensional therapeutic traction to the human body, as defined in claim 12, including means for selectively limiting the reciprocal travel of said carriage along the opening in the table.

15. Apparatus for concurrently applying three-dimensional therapeutic traction to the human body, as defined in claim 14, wherein the means for limiting said travel comprises: a tripper arm mounted on said carriage and extending therefrom; a pair of spaced-apart pressure release valves slidably mounted on said table for relative movement with respect to each other, said pressure release valves being operatively connected to said pneumatic cylinder and piston assembly mounted on said table and connected by its piston rod to said carriage, so that release of pressure in one of said valves will move the piston and piston rod of said assembly and said carriage in one direction, and release of pressure in the other of said valves will move said piston, piston rod, and carriage in the opposite direction, the distance between said valves being selectively set relative to each other to correspond to the desired distance of travel of the carriage; and tripper buttons mounted on said pressure release valves and disposed so as to be alternately contacted by said tripper arm on reciprocal movement of said carriage to release pressure from said valves.

16. Apparatus for concurrently applying three-dimensional therapeutic traction to the human body, which comprises: a table for statically supporting the torso of a patient in a supine position thereon; adjustable means on said table for independently supporting the head of the patient in a comfortable position; adjustable pneumatic pressure actuated means associated with said head support means for applying a gentle longitudinal force to the head area of the patient in a direction to apply traction to the spinal column of the patient; adjustable means on said table for independently supporting the lower extremities of the patient in a comfortable position; pneumatic pressure actuated means for simultaneously applying a gentle longitudinal force to said lower extremities in a direction opposite to the direction of the application of the force applied to the head area, to apply traction to the spinal column in said opposite direction; pneumatic pressure actuated means for simultaneously applying a vertical traction force to a selected section of the spinal column of the patient in a traveling, longitudinally reciprocal and laterally restricted path parallel to said spinal column; a pneumatic pressure assembly mounted on and suspended from said table, said assembly comprising an electric motor connected to a source of electric power, a compressor driven by said motor, a radiator, and a fan driven by said motor and positioned to cool said radiator; pneumatic pressure lines leading from said pneumatic pressure assembly to said pneumatic pressure means for applying traction; a second electric motor connected to said source of electric power, mounted on said means for applying vertical traction force; a vibration governor mounted on said second electric motor so as to apply a controlled rhythmic, vibratory beat to said vertical traction force; a pad on said table disposed under said patient and extending from the upper neck area of said patient to the area of the buttocks of said patient; a heat generating element disposed in said pad and connected to said source of electric power so as to apply heat to the area of the spinal column of the patient during application of said vertical traction force and said rhythmic, vibratory beat; a control panel mounted on said table; a rheostat mounted on said control panel and electrically connected to said second motor so as to control electric current flowing to said second motor and control the speed of said second motor; a second rheostat mounted on said control panel and electrically connected to said heat generating element so as to control the electric current flow to said heat generating element and the amount of heat generated thereby; and a timer mounted on said control panel and electrically connected to said pneumatic pressure assembly motor, said second motor, and said heat element, to control the time of operation thereof.

17. Apparatus for concurrently applying three-dimensional thereapeutic traction to the human body, which comprises: a table for statically supporting the torso of a patient in a supine position thereon; adjustable means on said table for independently supporting the head of the patient in a comfortable position; adjustable means associated with said head support means for applying a gentle longitudinal force to the head area of the patient in a direction to apply traction to the spinal column of the patient; a carriage slidably mounted for longitudinal axial movement on said table in the area of the feet of the patient; padded support brackets to receive the back of the ankles of the patient and to secure said ankles on the carriage, said brackets being mounted on said carriage and adapted to be anchored at selected positions longitudinally on said carriage to compensate for differences in height of patients; a pneumatic cylinder mounted on said table adjacent said carriage; a piston slidably disposed in said cylinder; a piston rod having one end thereof attached to said piston and having the other end thereof protruding from said cylinder; a notched piston rod extension mounted at one end thereof on said protruding end of said piston rod and adjustably mounted at said selected locations along its length to said carriage so as to further compensate for differences in height of patients, and so as to simultaneously apply a gentle longitudinal traction force to the lower extremities of the patient in a direction opposite to the direction of the application of traction force to the head area of the patient; means for simultaneously applying a vertical traction force to a selected section of the spinal column of the patient in a traveling, longitudinally reciprocal and laterally restricted path parallel to said spinal column; means for applying a controlled rhythmic, vibratory beat to said vertical traction force; and means for applying heat to the area of the spinal column during application of said vertical traction force and said rhythmic, vibratory beat.

18. Apparatus for concurrently applying three-dimensional therapeutic traction to the human body as defined in claim 17, including an end plate on the carriage; an axial bore in said end plate in which said piston rod extension is disposed; and a cap on the free end of said piston rod extension disposed so as to prevent the withdrawal of said piston rod extension from said bore.

19. Apparatus for concurrently applying three-dimensional therapeutic traction to the human body as defined in claim 18, including means on said carriage engageable with a selected notch in said piston rod extension so as to foreshorten the stroke of said piston rod extension and of said piston rod.

20. Apparatus for concurrently applying three-dimensional therapeutic traction to the human body as defined in claim 19, wherein the means to foreshorten the stroke of said piston rod extension and said piston rod comprises: a spring-actuated plunger slidably mounted on said carriage; and an enlarged detent mounted on said plunger, said detent being biased by said spring-actuated plunger so as to be engageable with a selected notch in said piston rod extension so as to determine the length of travel of said carriage when said piston, piston rod, and piston rod extension are actuated by pneumatic pressure in said cylinder.

21. Apparatus for concurrently applying three-dimensional therapeutic traction to the human body, which comprises: a table for statically supporting the torso of a patient in a supine position thereon; adjustable means on said table for independently supporting the head of the patient in a comfortable position; adjustable means associated with said head support means for applying a gentle longitudinal force to the head area of the patient in a direction to apply traction to the spinal column of the patient; adjustable means on said table for independently supporting the lower extremities of the patient in a comfortable position; means for simultaneously applying a gentle longitudinal force to said lower extremities in a direction opposite to the direction of the application of the force applied to the head area, to apply traction to the spinal column in said opposite direction; means for simultaneously applying a vertical traction force to a selected section of the spinal column of the patient in a traveling, longitudinally reciprocal and laterally restricted path parallel to said spinal column; means for applying a controlled rhythmic, vibratory beat to said vertical traction force; the adjustable means for independently supporting the head of the patient comprising a pair of substantially parallel vertical posts adjustable as to height and spaced apart from each other, said posts being mounted on said table so as to be selectively positioned longitudinally on said table; and a sling-type head rest rotatably mounted on said posts and disposed therebetween; and the adjustable means for applying traction force to the head area of the patient comprising a second pair of substantially parallel vertical posts adjustable as to height and spaced apart from each other, one of each of said second posts being disposed closely adjacent to one of said first posts; a chin strap adjustably mounted on said second posts and disposed therebetween so as to be selectively, firmly seated under the chin of the patient; and a pneumatic cylinder and piston assembly mounted on said table and connected to said first and second posts so as to move said posts as a unit longitudinally outwardly in relation to said table.

22. Apparatus for concurrently applying three-dimensional therapeutic traction to the human body, which comprises: a table for statically supporting the torso of a patient in a supine position thereon; adjustable means on said table for independently supporting the head of the patient in a comfortable position; adjustable means associated with said head support means for applying a gentle longitudinal force to the head area of the patient in a direction to apply traction to the spinal column of the patient; adjustable means on said table for independently supporting the lower extremities of the patient in a comfortable position; means for simultaneously applying a gentle longitudinal force to said lower extremities in a direction opposite to the direction of the application of the force applied to the head area, to apply traction to the spinal column in said opposite direction; means for simultaneously applying a vertical traction force to a selected section of the spinal column of the patient in a traveling, longitudinally reciprocal and laterally restricted path parallel to said spinal column; means for applying a controlled rhythmic, vibratory beat to said vertical traction force; and means for applying heat to the area of the spinal column during application of said vertical traction force and said rhythmic, vibratory beat; the adjustable means for supporting the lower extremities of the patient comprising a carriage slidably mounted for longitudinal axial movement on said table, and padded support brackets adjustably mounted longitudinally on said carriage, said brackets being disposed so as to receive and secure the ankles of said patient; and a pneumatic cylinder and piston assembly mounted on said table and connected to said carriage so as to move said carriage outwardly in relation to said table.

23. Apparatus for concurrently applying three-dimensional therapeutic traction to the human body, which comprises: a table for statically supporting the torso of a patient in a supine position thereon; adjustable means on said table for independently supporting the head of a patient in a comfortable position; adjustable means associated with said head support for applying a gentle longitudinal force to the head area of the patient in a direction to apply traction to the spinal column of the patient; adjustable means on said table for independently supporting the lower extremities of the patient in a comfortable position; means for simultaneously applying a gentle longitudinal force to said lower extremities in a direction opposite to the direction of the application of the force applied to the head area, to apply traction to the spinal column in said opposite direction; a carriage slidably suspended under the top of the table and aligned with an elongate slotted opening formed longitudinally, axially along said table, said opening extending generally from a point on said table in the area where the head of the patient is disposed to a point in the area where the buttocks of the patient are disposed, said carriage being reciprocally movable along substantially the entire length of said opening; a walking beam rotatably mounted on said carriage so as to be moved upwardly through said opening in the table; a plurality of rollers rotatably mounted on said walking beam adjacent opposite ends of said walking beam and adapted to press upon a selected section of the spinal column of the patient in a longitudinally reciprocal and laterally restricted path parallel to said spinal column so as to apply vertical traction force thereto; means mounted on said walking beam for imparting a vibratory beat to said walking beam and said rollers; means for reciprocally moving said carriage along the opening in said table; means for selectively moving said walking beam and rollers upwardly; means for applying a controlled rhythmic, vibratory beat to said vertical traction force; the means for imparting a vibratory beat to said walking beam and rollers comprising: a downwardly directed yoke formed at each end of said walking beam; and a vibrator motor suspendably mounted on said walking beam between said yokes.

24. Apparatus for concurrently applying three-dimensional therapeutic traction to the human body as defined in claim 23, including shock absorbing rings interposed between said walking beam and the rotatable mounting of said walking beam on said carriage so as to prevent the transmission of the vibratory beat to said carriage.

25. Apparatus for concurrently applying three-dimensional therapeutic traction to the human body as defined in claim 23, including a protruding, rotating shaft on said motor; and a vibration governor mounted on the protruding end of said motor shaft.

26. Apparatus for concurrently applying three-dimensional therapeutic traction to the human body as defined in claim 25, wherein said vibration governor comprises: a main governor shaft mounted on the protruding end of said motor shaft at a right angle thereto; a weight mounted on the free end of said main governor shaft; a hollow tube slidably mounted on said main governor shaft, extending over said motor shaft and disposed so as to move outwardly from said main governor shaft and said motor shaft upon the application of centrifugal force thereto; a spring circumferentially mounted about said tube and seated on said motor shaft and said tube so as to bias said tube against said centrifugal force; and a fly-shoe weight mounted on the end of said tube which extends over said motor shaft.

27. Apparatus for concurrently applying three-dimensional therapeutic traction to the human body as defined in claim 26, wherein said fly-shoe weight is lighter than the weight mounted on said main governor shaft.

28. Apparatus for concurrently applying three-dimensional therapeutic traction to the human body as defined in claim 26, wherein said main governor shaft is hollow, and including a bore in said main governor shaft in which said motor shaft is disposed; and a set screw disposed in said hollow main governor shaft so as to mount said main governor shaft on said motor shaft.

29. Apparatus for concurrently applying three-dimensional therapeutic traction to the human body as defined in claim 26, including a motor housing, and wherein said weight and said fly-weight are arcuate so as to rotate freely within said housing upon the rotation of said motor shaft and the application of centrifugal force to said vibration governor.

30. Apparatus for concurrently applying three-dimensional therapeutic traction to the human body, which comprises: a table for statically supporting the torso of a patient in a supine position thereon, said table having an elongate slotted opening formed longitudinally, axially along said table and extending generally from a point on said table where the head of the patient is disposed to a point where the buttocks of the patient are disposed; adjustable means on said table for independently supporting the head of the patient in a comfortable position; adjustable means associated with said head support means for applying a gentle longitudinal force to the head area of the patient in a direction to apply traction to the spinal column of the patient; adjustable means on said table for independently supporting the lower extremities of the patient in a comfortable position; means for simultaneously applying a gentle longitudinal force to said lower extremities in a direction opposite to the direction of the application of the force applied to the head area, to apply traction to the spinal column in said opposite direction; means projectable in the slotted opening in the table for simultaneously applying a vertical traction force to a selected section of the spinal column of the patient in a traveling, longitudinally reciprocal and laterally restricted path parallel to said spinal column; means for applying a controlled rhythmic, vibratory beat to said vertical traction force; a pad disposed on said table between said head support means and the means for supporting the lower extremities of the patient so as to support the patient from the upper neck area to the thigh area, said pad having an elongate slotted opening extending longitudinally, axially, and aligned and coextensive with the slotted opening in said table so as to receive said means for applying vertical traction force to the spinal column of the patient; a flexible, resilient cover disposed over the slotted opening in said pad, heat generating means contained in said cover, and said cover being adapted to receive said vertical traction force and said vibratory beat and transmit them, together with heat generated by said heat generating means to the spinal column area of the patient.

31. Apparatus for concurrently applying three-dimensional therapeutic traction to the human body as defined in claim 30, wherein said heat generating means comprises serpentine strips of carbon cloth connected to a source of electric current.

32. Apparatus for concurrently applying three-dimensional therapeutic traction to the human body, as defined in claim 31, wherein said cover disposed over the slotted opening in the pad is laminated and comprises, seriatim: an outer layer of flexible, resilient material; a layer of electric insulating material; said serpentine strips of carbon cloth; a second layer of electric insulating material; and a second layer of flexible, resilient material.

References Cited by the Examiner
UNITED STATES PATENTS

| | | | |
|---|---|---|---|
| 901,628 | 10/1908 | Langworthy | 128—71 |
| 1,348,896 | 8/1920 | Riesland | 128—71 |
| 1,642,158 | 9/1927 | Kubista | 128—71 |
| 2,150,519 | 3/1939 | Rogers et al. | 128—71 |
| 2,320,261 | 5/1943 | Buffalow | 128—57 |
| 2,448,777 | 9/1948 | Crise | 128—33 |
| 2,492,406 | 12/1949 | Thomas | 128—33 |
| 2,534,587 | 12/1950 | Fisher | 128—71 |
| 2,660,999 | 12/1953 | Thornton | 128—71 |
| 2,781,040 | 2/1957 | Hill | 128—33 |
| 2,909,173 | 10/1959 | Anderson | 128—33 |
| 2,927,576 | 3/1960 | Sibert | 128—24.1 |
| 2,934,063 | 4/1960 | Elsasser | 128—33 |
| 2,998,817 | 9/1961 | Armstrong | 128—376 |
| 3,003,497 | 10/1961 | Nones | 128—33 |
| 3,039,458 | 6/1962 | Hill | 128—57 |
| 3,060,925 | 10/1962 | Honsaker | 128—57 |

RICHARD A. GAUDET, *Primary Examiner.*